United States Patent
Hofmann et al.

(10) Patent No.: US 10,471,652 B2
(45) Date of Patent: Nov. 12, 2019

(54) SYSTEMS AND METHODS FOR ADDITIVE MANUFACTURING PROCESSES THAT STRATEGICALLY BUILDUP OBJECTS

(71) Applicant: California Institute of Technology, Pasadena, CA (US)

(72) Inventors: Douglas C. Hofmann, Altadena, CA (US); John Paul C. Borgonia, Santa Fe Springs, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 16/139,959

(22) Filed: Sep. 24, 2018

(65) Prior Publication Data
US 2019/0022923 A1  Jan. 24, 2019

Related U.S. Application Data

(62) Division of application No. 14/332,187, filed on Jul. 15, 2014, now Pat. No. 10,081,136.
(Continued)

(51) Int. Cl.
*B29C 64/20* (2017.01)
*B29C 64/106* (2017.01)
(Continued)

(52) U.S. Cl.
CPC .......... *B29C 64/106* (2017.08); *B22D 23/003* (2013.01); *B29C 64/112* (2017.08);
(Continued)

(58) Field of Classification Search
CPC ... B29C 64/106; B29C 64/112; B29C 64/386; B29C 64/20; B33Y 10/00; B33Y 30/00
(Continued)

(56) References Cited

U.S. PATENT DOCUMENTS

| 3,435,512 A | 4/1969 | Macrobbie |
| 3,529,457 A | 9/1970 | Bowers |

(Continued)

FOREIGN PATENT DOCUMENTS

| CN | 101709773 A | 5/2010 |
| CN | 102563006 A | 7/2012 |

(Continued)

OTHER PUBLICATIONS

Hong et al., "Microstructural characteristics of high-velocity oxygen-fuel (HVOF) sprayed nickel-based alloy coating", Journal of Alloys and Compounds, Jul. 26, 2013, vol. 581, pp. 398-403.
(Continued)

*Primary Examiner* — Christina A Johnson
*Assistant Examiner* — Xue H Liu
(74) *Attorney, Agent, or Firm* — KPPB LLP

(57) ABSTRACT

Systems and methods in accordance with embodiments of the invention implement additive manufacturing techniques that employ different sets of deposition characteristics and/or material formation characteristics during the additive manufacture of an object so as to strategically build up the object. In many embodiments, material used to build up an object is deposited at different deposition rates during the additive manufacture of the object, and the object is thereby strategically built up. In one embodiment, a method of additively manufacturing an object includes: depositing material onto a surface at a first deposition rate so as to define a first region of the object to be additively manufactured; and depositing material onto a surface at a second deposition rate so as to define a second region of the object to be additively manufactured; where the second deposition rate is different from the first deposition rate.

20 Claims, 16 Drawing Sheets

Related U.S. Application Data

(60) Provisional application No. 61/846,501, filed on Jul. 15, 2013.

(51) Int. Cl.
*B22D 23/00* (2006.01)
*B33Y 10/00* (2015.01)
*B33Y 30/00* (2015.01)
*B29C 64/112* (2017.01)
*B29C 64/386* (2017.01)

(52) U.S. Cl.
CPC ............ *B29C 64/20* (2017.08); *B29C 64/386* (2017.08); *B33Y 10/00* (2014.12); *B33Y 30/00* (2014.12)

(58) Field of Classification Search
USPC ....................................................... 264/294
See application file for complete search history.

(56) References Cited

U.S. PATENT DOCUMENTS

| | | |
|---|---|---|
| 3,682,606 A | 8/1972 | Anderson et al. |
| 3,986,412 A | 10/1976 | Farley et al. |
| RE29,989 E | 5/1979 | Polk |
| 4,173,393 A | 11/1979 | Maurer |
| 4,202,404 A | 5/1980 | Carlson |
| 4,711,795 A | 12/1987 | Takeuchi et al. |
| 4,749,625 A | 6/1988 | Obayashi et al. |
| 4,810,314 A | 3/1989 | Henderson et al. |
| 4,812,150 A | 3/1989 | Scott |
| 4,823,638 A | 4/1989 | Ishikawa |
| 4,851,296 A | 7/1989 | Tenhover et al. |
| 4,883,632 A | 11/1989 | Goto et al. |
| 5,168,918 A | 12/1992 | Okuda et al. |
| 5,288,344 A | 2/1994 | Peker et al. |
| 5,310,432 A | 5/1994 | Yamanaka et al. |
| 5,485,761 A | 1/1996 | Rouverol |
| 5,509,978 A | 4/1996 | Masumoto et al. |
| 5,636,550 A | 6/1997 | Deane |
| 5,722,295 A | 3/1998 | Sakai et al. |
| 5,746,844 A | 5/1998 | Sterett et al. |
| 5,772,803 A | 6/1998 | Peker et al. |
| 5,866,272 A | 2/1999 | Westre et al. |
| 5,896,642 A | 4/1999 | Peker et al. |
| 5,985,204 A | 11/1999 | Otsuka et al. |
| 6,162,130 A | 12/2000 | Masumoto et al. |
| 6,273,322 B1 | 8/2001 | Yamamoto et al. |
| 6,620,264 B2 | 9/2003 | Kundig et al. |
| 6,652,679 B1 | 11/2003 | Inoue et al. |
| 6,771,490 B2 | 8/2004 | Peker et al. |
| 6,843,496 B2 | 1/2005 | Peker et al. |
| 6,887,586 B2 | 5/2005 | Peker et al. |
| 7,052,561 B2 | 5/2006 | Lu et al. |
| 7,073,560 B2 | 7/2006 | Kang et al. |
| 7,075,209 B2 | 7/2006 | Howell et al. |
| 7,357,731 B2 | 4/2008 | Johnson et al. |
| 7,360,419 B2 | 4/2008 | French et al. |
| 7,497,981 B2 | 3/2009 | Graham et al. |
| 7,500,987 B2 | 3/2009 | Bassler et al. |
| 7,540,929 B2 | 6/2009 | Demetriou et al. |
| 7,552,664 B2 | 6/2009 | Bulatowicz |
| 7,862,323 B2 | 1/2011 | Micarelli et al. |
| 7,883,592 B2 | 2/2011 | Hofmann et al. |
| 7,896,982 B2 | 3/2011 | Johnson et al. |
| 7,955,713 B2 | 6/2011 | Roebroeks et al. |
| 8,042,770 B2 | 10/2011 | Martin et al. |
| 8,400,721 B2 | 3/2013 | Bertele et al. |
| 8,418,366 B2 | 4/2013 | Wang et al. |
| 8,485,245 B1 | 7/2013 | Prest et al. |
| 8,596,106 B2 | 12/2013 | Tang et al. |
| 8,613,815 B2 | 12/2013 | Johnson et al. |
| 8,639,484 B2 | 1/2014 | Wei et al. |
| 8,789,629 B2 | 7/2014 | Parness et al. |
| 8,986,469 B2 | 3/2015 | Khalifa et al. |
| 9,057,120 B2 | 6/2015 | Pham et al. |
| 9,211,564 B2 | 12/2015 | Hofmann |
| 9,328,813 B2 | 5/2016 | Hofmann et al. |
| 9,610,650 B2 | 4/2017 | Hofmann et al. |
| 9,783,877 B2 | 10/2017 | Hofmann et al. |
| 9,791,032 B2 | 10/2017 | Hofmann et al. |
| 9,868,150 B2 | 1/2018 | Hofmann et al. |
| 10,081,136 B2 | 9/2018 | Hofmann et al. |
| 2002/0053375 A1 | 5/2002 | Hays et al. |
| 2002/0100573 A1 | 8/2002 | Inoue et al. |
| 2002/0184766 A1 | 12/2002 | Kobayashi et al. |
| 2003/0052105 A1 | 3/2003 | Nagano et al. |
| 2003/0062811 A1 | 4/2003 | Peker et al. |
| 2004/0103536 A1 | 6/2004 | Kobayashi et al. |
| 2004/0103537 A1 | 6/2004 | Kobayashi et al. |
| 2004/0154701 A1 | 8/2004 | Lu et al. |
| 2005/0034792 A1 | 2/2005 | Lu et al. |
| 2005/0127139 A1 | 6/2005 | Slattery et al. |
| 2005/0263932 A1 | 12/2005 | Heugel |
| 2006/0105011 A1 | 5/2006 | Sun et al. |
| 2006/0156785 A1 | 7/2006 | Mankame et al. |
| 2007/0034304 A1 | 2/2007 | Inoue et al. |
| 2007/0226979 A1 | 10/2007 | Paton et al. |
| 2007/0228592 A1 | 10/2007 | Dunn et al. |
| 2008/0085368 A1 | 4/2008 | Gauthier et al. |
| 2008/0121316 A1 | 5/2008 | Duan et al. |
| 2009/0011846 A1 | 1/2009 | Scott |
| 2009/0114317 A1 | 5/2009 | Collier et al. |
| 2009/0194205 A1 | 8/2009 | Loffler et al. |
| 2009/0288741 A1 | 11/2009 | Zhang et al. |
| 2010/0313704 A1 | 12/2010 | Wang et al. |
| 2011/0048587 A1 | 3/2011 | Vecchio et al. |
| 2011/0154928 A1 | 6/2011 | Ishikawa |
| 2011/0302783 A1 | 12/2011 | Nagata et al. |
| 2012/0067100 A1 | 3/2012 | Stefansson et al. |
| 2012/0073710 A1 | 3/2012 | Kim et al. |
| 2012/0077052 A1 | 3/2012 | Demetriou et al. |
| 2012/0133080 A1 | 5/2012 | Moussa et al. |
| 2013/0009338 A1 | 1/2013 | Mayer |
| 2013/0062134 A1 | 3/2013 | Parness et al. |
| 2013/0112321 A1 | 5/2013 | Poole et al. |
| 2013/0133787 A1 | 5/2013 | Kim |
| 2013/0139964 A1 | 6/2013 | Hofmann et al. |
| 2013/0280547 A1 | 10/2013 | Brandl et al. |
| 2013/0309121 A1 | 11/2013 | Prest et al. |
| 2013/0333814 A1 | 12/2013 | Fleury et al. |
| 2014/0004352 A1 | 1/2014 | McCrea et al. |
| 2014/0020794 A1 | 1/2014 | Hofmann et al. |
| 2014/0030948 A1 | 1/2014 | Kim et al. |
| 2014/0045680 A1 | 2/2014 | Nakayama et al. |
| 2014/0048969 A1 | 2/2014 | Swanson et al. |
| 2014/0070445 A1 | 3/2014 | Mayer |
| 2014/0083640 A1 | 3/2014 | Waniuk et al. |
| 2014/0090752 A1 | 4/2014 | Waniuk et al. |
| 2014/0093674 A1 | 4/2014 | Hofmann et al. |
| 2014/0141164 A1 | 5/2014 | Hofmann |
| 2014/0202595 A1 | 7/2014 | Hofmann |
| 2014/0213384 A1 | 7/2014 | Johnson et al. |
| 2014/0224050 A1 | 8/2014 | Hofmann et al. |
| 2014/0227125 A1 | 8/2014 | Hofmann |
| 2014/0246809 A1 | 9/2014 | Hofmann |
| 2014/0293384 A1 | 10/2014 | O'keeffe et al. |
| 2014/0312098 A1 | 10/2014 | Hofmann et al. |
| 2014/0334106 A1 | 11/2014 | Prest et al. |
| 2014/0342179 A1 | 11/2014 | Hofmann et al. |
| 2014/0348571 A1 | 11/2014 | Prest et al. |
| 2015/0014885 A1 | 1/2015 | Hofmann et al. |
| 2015/0047463 A1 | 2/2015 | Hofmann et al. |
| 2015/0068648 A1 | 3/2015 | Schroers et al. |
| 2015/0075744 A1 | 3/2015 | Hofmann et al. |
| 2015/0289605 A1 | 10/2015 | Prest et al. |
| 2015/0314566 A1 | 11/2015 | Mattlin et al. |
| 2016/0178047 A1 | 6/2016 | Kennett et al. |
| 2016/0186850 A1 | 6/2016 | Hofmann et al. |
| 2016/0258522 A1 | 9/2016 | Hofmann et al. |
| 2016/0263937 A1 | 9/2016 | Parness et al. |
| 2016/0265576 A1 | 9/2016 | Hofmann et al. |
| 2016/0299183 A1 | 11/2016 | Lee |

(56) References Cited

U.S. PATENT DOCUMENTS

| | | | |
|---|---|---|---|
| 2016/0361897 | A1 | 12/2016 | Hofmann et al. |
| 2017/0121799 | A1 | 5/2017 | Hofmann et al. |
| 2017/0137955 | A1 | 5/2017 | Hofmann et al. |
| 2017/0226619 | A1 | 8/2017 | Hofmann et al. |
| 2018/0119259 | A1 | 5/2018 | Hofmann et al. |

FOREIGN PATENT DOCUMENTS

| | | | |
|---|---|---|---|
| CN | 103153502 | A | 6/2013 |
| DE | 102010062089 | A1 | 5/2012 |
| EP | 0127366 | A1 | 5/1984 |
| EP | 1063312 | A1 | 12/2000 |
| EP | 1138798 | A1 | 10/2001 |
| EP | 1696153 | A1 | 8/2006 |
| EP | 1404884 | B1 | 7/2007 |
| EP | 1944138 | A2 | 7/2008 |
| JP | 61276762 | A | 12/1986 |
| JP | 2002045960 | A | 2/2002 |
| JP | 2004353053 | A | 12/2004 |
| JP | 2007040517 | A | 2/2007 |
| JP | 2007040518 | A | 2/2007 |
| JP | 2007247037 | A | 9/2007 |
| JP | 2008264865 | A | 11/2008 |
| JP | 2013238278 | A | 11/2013 |
| WO | 2007038882 | A1 | 4/2007 |
| WO | 2008156889 | A2 | 12/2008 |
| WO | 2011159596 | A1 | 12/2011 |
| WO | 2012031022 | A2 | 3/2012 |
| WO | 2012083922 | A1 | 6/2012 |
| WO | 2012147559 | A1 | 11/2012 |
| WO | 2013138710 | A1 | 9/2013 |
| WO | 2013141878 | A1 | 9/2013 |
| WO | 2013141882 | A1 | 9/2013 |
| WO | 2014004704 | A1 | 1/2014 |
| WO | 2014012113 | A2 | 1/2014 |
| WO | 2014058498 | A3 | 4/2014 |
| WO | 2015042437 | A1 | 3/2015 |
| WO | 2015156797 | A1 | 10/2015 |

OTHER PUBLICATIONS

Hu et al., "Crystallization Kinetics of the Cu47.5Zr74.5A15 Bulk Metallic Glass under Continuous and Iso-thermal heating", App. Mech. and Materials, vols. 99-100, Sep. 8, 2011, p. 1052-1058.

Huang et al., "Dendritic microstructure in the metallic glass matrix composite $Zr_{56}Ti_{14}Nb_5Cu_7Ni_6Be_{12}$", Scripta Materialia, Mar. 29, 2005, vol. 53, pp. 93-97.

Huang et al., "Fretting wear behavior of bulk amorphous steel", Intermetallics, Jun. 12, 2011, vol. 19, pp. 1385-1389.

Inoue et al., "Cobalt-based bulk glassy alloy with ultrahigh strength and soft magnetic properties", Nature Materials, Sep. 21, 2003, vol. 2, pp. 661-663.

Inoue et al., "Development and applications of late transition metal bulk metallic glasses", Bulk Metallic Glasses, pp. 1-25, 2008.

Inoue et al., "Developments and applications of bulk metallic glasses", Reviews on Advanced Materials Science, Feb. 28, 2008, vol. 18, pp. 1-9.

Inoue et al., "Preparation of 16 mm diameter Rod of Amorphous $Zr_{65}Al_{7.5}Ni_{10}Cu_{17.5}$ Alloy", Material Transactions, JIM, 1993, vol. 34, No. 12, pp. 1234-1237.

Inoue et al., "Recent development and application products of bulk glassy alloys", Acta Materialia, Jan. 20, 2011, vol. 59, Issue 6, pp. 2243-2267.

Ishida et al., "Wear resistivity of super-precision microgear made of Ni-based metallic glass", Materials Science and Engineering, Mar. 25, 2007, vol. A449-451, pp. 149-154.

Jiang et al., "Low-Density High-Strength Bulk Metallic Glasses and Their Composites: A Review", Advanced Engineering Materials, Nov. 19, 2014, pp. 1-20, DOI: 10.1002/adem.201400252.

Jiang et al., "Tribological Studies of a Zr-Based Glass-Forming Alloy with Different States", Advanced Engineering Materials, Sep. 14, 2009, vol. 1, No. 11, pp. 925-931.

Johnson et al., "Quantifying the Origin of Metallic Glass Formation", Nature Communications, Jan. 20, 2016, vol. 7, 10313, 7 pgs., doi: 10.1038/ncomms10313.

Jung et al., "Fabrication of Fe-based bulk metallic glass by selective laser melting: A parameter study", Materials and Design, Jul. 30, 2015, vol. 86, pp. 703-708.

Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.

Kim, Junghwan et al. "Oxidation and crystallization mechanisms in plasma-sprayed Cu-based bulk metallic glass coatings", Acta Materialia., Feb. 1, 2010, vol. 58, pp. 952-962.

Kim et al., "Amorphous phase formation of Zr-based alloy coating by HVOF spraying process", Journal of Materials Science, Jan. 1, 2001, vol. 36, pp. 49-54.

Kim et al., "Design and synthesis of Cu-based metallic glass alloys with high glass forming ability", Journal of Metastable and Nanocrystalline Materials, Sep. 1, 2005, vols. 24-25, pp. 93-96.

Kim et al., "Enhancement of metallic glass properties of Cu-based BMG coating by shroud plasma spraying", Science Direct, Surface & Coatings Technology, Jan. 25, 2011, vol. 205, pp. 3020-3026, Nov. 6, 2010.

Kim et al., "Production of $Ni_{65}Cr_{15}P_{16}B_4$ Metallic Glass-Coated Bipolar Plate for Fuel Cell by High Velocity Oxy-Fuel (HVOF) Spray Coating Method", The Japan Institute of Metals, Materials Transactions, Aug. 25, 2010, vol. 51, No. 9, pp. 1609-1613.

Kim et al., "Realization of high tensile ductility in a bulk metallic glass composite by the utilization of deformation-induced martensitic transformation", Scripta Materialia, May 3, 2011, vol. 65, pp. 304-307.

Kim et al., "Weldability of $Cu_{54}Zr_{22}Ti_{18}Ni_6$ bulk metallic glass by ultrasonic welding processing", Materials Letters, May 17, 2014, 130, pp. 160-163.

Kobayashi et al., "Fe-based metallic glass coatings produced by smart plasma spraying process", Materials Science and Engineering, Feb. 25, 2008, vol. B148, pp. 110-113.

Kobayashi et al., "Mechanical property of Fe-base metallic glass coating formed by gas tunnel type plasma spraying", ScienceDirect, Surface & Coatings Technology, Mar. 14, 2008, 6 pgs.

Kobayashi et al., "Property of Ni-Based Metallic Glass Coating Produced by Gas Tunnel Type Plasma Spraying", International Plasma Chemistry Society, ISPC 20, 234, Philadelphia, USA, Jul. 24, 2011, Retrieved from: http://www.ispc-conference.org/ispcproc/ispc20/234.pdf.

Kong et al., "Effect of Flash Temperature on Tribological Properties of Bulk Metallic Glasses", Tribol. Lett., Apr. 25, 2009, vol. 35, pp. 151-158.

Kozachkov et al., "Effect of cooling rate on the volume fraction of B2 phases in a CuZrAlCo metallic glass matrix composite", Intermetallics, Apr. 19, 2013, vol. 39, pp. 89-93.

Kuhn et al., "Microstructure and mechanical properties of slowly cooled Zr—Nb—Cu—Ni—Al composites with ductile bcc phase", Materials Science and Engineering: A, Jul. 2004, vol. 375-377, pp. 322-326.

Kuhn et al., "ZrNbCuNiAl bulk metallic glass matrix composites containing dendritic bcc phase precipitates", Applied Physics Letters, Apr. 8, 2002, vol. 80, No. 14, pp. 2478-2480.

Kumar et al., "Bulk Metallic Glass: The Smaller the Better", Advanced Materials, Jan. 25, 2011, vol. 23, pp. 461-476.

Kwon et al., "Wear behavior of Fe-based bulk metallic glass composites", Journal of Alloys and Compounds, Jul. 14, 2011, vol. 509S, pp. S105-S108.

Launey et al., "Fracture toughness and crack-resistance curve behavior in metallic glass-matrix composites", Applied Physics Letters, Jun. 18, 2009, vol. 94, pp. 241910-1-241910-3.

Launey et al., "Solution to the problem of the poor cyclic fatigue resistance of bulk metallic glasses", PNAS Early Edition, pp. 1-6, Jan. 22, 2009.

Lee et al., "Effect of a controlled volume fraction of dendritic phases on tensile and compressive ductility in La-based metallic glass matrix composites", Acta Materialia, vol. 52, Issue 14, Jun. 17, 2004, pp. 4121-4131.

(56) References Cited

OTHER PUBLICATIONS

Lee et al., "Nanomechanical properties of embedded dendrite phase and its influence on inelastic deformation of $Zr_{55}Al_{10}Ni_5Cu_{30}$ glassy alloy", Materials Science and Engineering A, Mar. 25, 2007, vol. 375, pp. 945-948.
Li et al., "Selective laser melting of Zr-based bulk metallic glasses: Processing, microstructure and mechanical properties", Materials and Design, Sep. 21, 2016, vol. 112, pp. 217-226.
Li et al., "Wear behavior of bulk $Zr_{41}Ti_{14}Cu_{12.5}Ni_{10}Be_{22.5}$ metallic glasses", J. Mater. Res., Aug. 2002, vol. 17, No. 8, pp. 1877-1880.
Lillo et al., "Microstructure, Processing, Performance Relationships for High Temperature Coatings", U.S. Department of Energy, Office of Fossil Energy, under DOE Idaho Operations Office, Contract DE-AC07-05ID14517; 22nd Annual Conference on Fossil Energy Materials, Pittsburgh, U.S., 8 pgs., Jul. 1, 2008.
Lin et al., "Designing a toxic-element-free Ti-based amorphous alloy with remarkable supercooled liquid region for biomedical application", Intermetallics, Jul. 9, 2014, vol. 55, pp. 22-27.
List, A. et al. "Impact Conditions for Cold Spraying of Hard Metallic Glasses", Journal of Thermal Spray Technology, Jun. 1, 2012, vol. 21, No. 3-4, pp. 531-540.
Liu, X. Q. "Microstructure and properties of Fe-based amorphous metallic coating produced by high velocity axial plasma spraying", Science Direct, Journal of Alloys and Compounds, Apr. 23, 2009, vol. 484, pp. 300-307.
Liu et al., "Influence of Heat Treatment on Microstructure and Sliding Wear of Thermally Sprayed Fe-Based Metallic Glass coatings", Tribol. Lett., Mar. 4, 2012, vol. 46, pp. 131-138.
Liu et al., "Metallic glass coating on metals plate by adjusted explosive welding technique", Applied Surface Science, Jul. 16, 2009, vol. 255, pp. 9343-9347.
Liu et al., "Sliding Tribological Characteristics of a Zr-based Bulk Metallic Glass Near the Glass Transition Temperature", Tribol. Lett., Jan. 29, 2009, vol. 33, pp. 205-210.
Liu et al., "Wear behavior of a Zr-based bulk metallic glass and its composites", Journal of Alloys and Compounds, May 5, 2010, vol. 503, pp. 138-144.
Lupoi, R. et al. "Deposition of metallic coatings on polymer surfaces using cold spray", Science Direct, Surface & Coatings Technology, Sep. 6, 2010, vol. 205, pp. 2167-2173.
Ma et al., "Wear resistance of Zr-based bulk metallic glass applied in bearing rollers", Materials Science and Engineering, May 4, 2004, vol. A386, pp. 326-330.
Maddala et al., "Effect of notch toughness and hardness on sliding wear of $Cu_{50}Hf_{41.5}A_{18.5}$ bulk metallic glass", Scripta Materialia, Jul. 6, 2011, vol. 65, pp. 630-633.
Mahbooba et al., "Additive manufacturing of an iron-based bulk metallic glass larger than the critical casting thickness", Applied Materials Today, Feb. 27, 2018, vol. 11, pp. 264-269.
Narayan et al., "On the hardness and elastic modulus of bulk metallic glass matrix composites", Scripta Materialia, Jun. 9, 2010, vol. 63, Issue 7, pp. 768-771.
Ni et al., "High performance amorphous steel coating prepared by HVOF thermal spraying", Journal of Alloys and Compounds, Jan. 7, 2009, vol. 467, pp. 163-167, Nov. 29, 2007.
Nishiyama et al., "Recent progress of bulk metallic glasses for strain-sensing devices", Materials Science and Engineering: A, Mar. 25, 2007, vols. 449-451, pp. 79-83.
Oh et al., "Microstructure and tensile properties of high-strength high-ductility Ti-based amorphous matrix composites containing ductile dendrites", Acta Materialia, Sep. 23, 2011, vol. 59, Issue 19, pp. 7277-7286.
Parlar et al., "Sliding tribological characteristics of Zr-based bulk metallic glass", Intermetallics, Jan. 2008, vol. 16, pp. 34-41.
Pauly et al., "Modeling deformation behavior of Cu—Zr—Al bulk metallic glass matrix composites", Applied Physics Letters, Sep. 2009, vol. 95, pp. 101906-1-101906-3.
Pauly et al., "Processing Metallic Glasses by Selective Laser Melting", Materials Today, Jan./Feb. 2013, vol. 16, pp. 37-41.
Pauly et al., "Transformation-mediated ductility in CuZr-based bulk metallic glasses", Nature Materials, May 16, 2010, vol. 9, Issue 6, pp. 473-477.
Ponnambalam et al., "Fe-based bulk metallic glasses with diameter thickness larger than one centimeter", J Mater Res, Feb. 17, 2004. vol. 19; pp. 1320-1323.
Porter et al., "Incorporation of Amorphous Metals into MEMS for High Performance and Reliability", Rockwell Scientific Company, Final Report, Nov. 1, 2003, 41 pgs.
Prakash et al., "Sliding wear behavior of some Fe-, Co- and Ni-based metallic glasses during rubbing against bearing steel", Tribology Letters, May 1, 2000, vol. 8, pp. 153-160.
Qiao et al., "Development of plastic Ti-based bulk-metallic-glass-matrix composites by controlling the microstructures", Materials Science and Engineering: A, Aug. 20, 2010, vol. 527, Issues 29-30, pp. 7752-7756.
Ramamurty et al., "Hardness and plastic deformation in a bulk metallic glass", Acta Materialia, Feb. 2005, vol. 53, pp. 705-717.
Revesz et al., "Microstructure and morphology of Cu—Zr—Ti coatings produced by thermal spray and treated by surface mechanical attrition", ScienceDirect, Journal of Alloys and Compounds, Jul. 14, 2011, vol. 509S, pp. S482-S485, Nov. 4, 2010.
Rigney et al., "The Evolution of Tribomaterial During Sliding: A Brief Introduction", Tribol. Lett, Jul. 1, 2010, vol. 39, pp. 3-7.
Roberts et al., "Cryogenic Charpy impact testing of metallic glass matrix composites", Scripta Materialia, Nov. 11, 2011, 4 pgs.
Sanders et al., "Stability of Al-rich glasses in the Al—La—Ni system", 2006, Intermetallics, 14, pp. 348-351.
Schuh et al., "A survey of instrumented indentation studies on metallic glasses", J. Mater. Res., Jan. 2004, vol. 19, No. 1, pp. 46-57.
Segu et al., "Dry Sliding Tribological Properties of Fe-Based Bulk Metallic Glass", Tribol. Lett., Apr. 28, 2012, vol. 47, pp. 131-138.
Shen et al., "3D printing of large, complex metallic glass structures", Materials and Design, Mar. 2017, vol. 117, pp. 213-222.
Shen et al., "Exceptionally high glass-forming ability of an FeCoCrMoCBY alloy", Applied Physics, Apr. 5, 2005, vol. 86, pp. 151907-1-151907-3.
Singer et al., "Wear behavior of triode-sputtered MoS2 coatings in dry sliding contact with steel and ceramics", Wear, Jul. 1996, vol. 195, Issues 1-2, pp. 7-20.
Sinmazcelik et al., "A review: Fibre metal laminates, background, bonding types and applied test methods", Materials and Design, vol. 32, Issue 7, 3671, Mar. 4, 2011, pp. 3671-3685.
Song et al., "Strategy for pinpointing the formation of B2 CuZr in metastable CuZr-based shape memory alloys", Acta Materialia, Aug. 6, 2011, vol. 59, pp. 6620-6630.
Sun et al., "Fiber metallic glass laminates", Dec. 2010, J. Mater. Res., vol. 25, No. 12, pp. 2287-2291.
Sundaram et al., "Mesoscale Folding, Instability, and Disruption of Laminar Flow in Metal Surfaces", Physical Review Letters, Sep. 7, 2012, vol. 109, pp. 106001-1-106001-5.
Szuecs et al., "Mechanical Properties of $Zr_{56.2}Ti_{13.8}Nb_{5.0}Cu_{6.9}Ni_{5.6}Be_{12.5}$ Ductile Phase Reinforced Bulk Metallic Glass Composite", Acta Materialia, Feb. 2, 2001, vol. 49, Issue 9, pp. 1507-1513.
Tam et al., "Abrasion resistance of Cu based bulk metallic glasses", Journal of Non-Crystalline Solids, Oct. 18, 2004, vol. 347, pp. 268-272.
Tam et al., "Abrasive wear of Cu60Zr30Ti10 bulk metallic glass", Materials Science and Engineering, Apr. 1, 2004, vol. A384 pp. 138-142.
Tan et al., "Synthesis of La-based in-situ bulk metallic glass matrix composite", Intermetallics, Nov. 2002, vol. 10, Issues 11-12, pp. 1203-1205.
Tao et al., "Effect of rotational sliding velocity on surface friction and wear behavior in Zr-based bulk metallic glass", Journal of Alloys and Compounds, Mar. 4, 2010, vol. 492, pp. L36-L39.
Tao et al., "Influence of isothermal annealing on the micro-hardness and friction property in CuZrAl bulk metallic glass", Advanced Materials Research, Jan. 1, 2011, vols. 146-147, pp. 615-618.

(56) References Cited

OTHER PUBLICATIONS

Tobler et al., "Cryogenic Tensile, Fatigue, and Fracture Parameters for a Solution-Annealed 18 Percent Nickel Maraging Steel", Journal of Engineering Materials and Technology, Apr. 1, 1978, vol. 100, pp. 189-194.
Wagner, "Mechanical Behavior of 18 Ni 200 Grade Maraging Steel at Cyrogenic Temperatures", J Aircraft, Nov. 1, 1986, vol. 23, No. 10, pp. 744-749.
Wang et al., "Progress in studying the fatigue behavior of Zr-based bulk-metallic glasses and their composites", Intermetallics, Mar. 6, 2009, vol. 17, pp. 579-590.
Whang et al., "Microstructures and age hardening of rapidly quenched Ti—Zr—Si alloys", Journal of Materials Science Letters, 1985, vol. 4, pp. 883-887.
Wikipedia, "Harmonic Drive", printed Feb. 20, 2014, 4 pgs.
Wu et al., "Bulk Metallic Glass Composites with Transformation-Mediated Work-Hardening and Ductility", Adv. Mater., Apr. 26, 2010, vol. 22, pp. 2770-2773.
Wu et al., "Dry Sliding tribological behavior of Zr-based bulk metallic glass", Transactions of Nonferrous Metals Society of China, Jan. 16, 2012, vol. 22, Issue 3, pp. 585-589.
Wu et al., "Effects of environment on the sliding tribological behaviors of Zr-based bulk metallic glass", Intermetallics, Jan. 27, 2012, vol. 25, 115-125.
Wu et al., "Formation of Cu—Zr—Al bulk metallic glass composites with improved tensile properties", Acta Materialia 59, Feb. 19, 2011, pp. 2928-2936.
Wu et al., "Use of rule of mixtures and metal volume fraction for mechanical property predictions of fibre-reinforced aluminum laminates", Journal of Materials Science, vol. 29, issue 17, 4583, Jan. 1994, 9 pages.
Yin, Enhuai et al. "Microstructure and mechanical properties of a spray-formed Ti-based metallic glass former alloy", Journal of Alloys and Compounds, Jan. 25, 2012, vol. 512, pp. 241-245.
Zachrisson et al., "Effect of Processing on Charpy impact toughness of metallic glass matrix composites", Journal of Materials Research, May 28, 2011, vol. 26, No. 10, pp. 1260-1268.
Zhang et al., "Abrasive and corrosive behaviors of Cu—Zr—Al—Ag—Nb bulk metallic glasses", Journal of Physics: Conference Series, 2009, vol. 144, pp. 1-4.
Zhang et al., "Robust hydrophobic Fe-based amorphous coating by thermal spraying", Appl. Phys. Lett., Sep. 20, 2012, vol. 101, pp. 121603-1-121603-4.
Zhang et al., "Wear behavior of a series of Zr-based bulk metallic glasses", Materials Science and Engineering, Feb. 25, 2008, vol. A475, pp. 124-127.
Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. u-2, pp. 344-350, Aug. 17, 2010.
Zhu et al., "Ta-particulate reinforced Zr-based bulk metallic glass matrix composite with tensile plasticity", Scripta Materialia, Mar. 2010, vol. 62, Issue 5, pp. 278-281.
Zhuo et al., "Spray formed Al-based amorphous matrix nanocomposite plate", ScienceDirect, Journal of Alloys and Compounds, Mar. 1, 2011, vol. 509, pp. L169-L173.
Ashby et al., "Metallic glasses of structural materials", Scripta Materialia, Feb. 2006, vol. 54, pp. 321-326.
Bakkal, "Sliding tribological characteristics of Zr-based bulk metallic glass under lubricated conditions", Intermetallics, Mar. 19, 2010, vol. 18, pp. 1251-1253.
Bardt et al., "Micromolding three-dimensional amorphous metal structures", J. Mater. Res, Feb. 2007, vol. 22, No. 2, pp. 339-343.
Basu et al., "Laser surface coating of Fe—Cr—Mo—Y—B—C bulk metallic glass composition on AISI 4140 steel", Surface & Coatings Technology, Mar. 15, 2008, vol. 202, pp. 2623-2631.
Boopathy et al., "Near-threshold fatigue crack growth in bulk metallic glass composites", J. Mater. Res., vol. 24, No. 12, pp. 3611-3619, Dec. 2009.
Bordeenithikasem et al., "Glass forming ability, flexural strength, and wear properties of additively manufactured Zr-based bulk metallic glasses produced through laser powder bed fusion", Additive Manufacturing, Mar. 21, 2018, vol. 21, pp. 312-317.
Branagan et al., "Wear Resistant Amorphous and Nanocomposite Steel Coatings", Met. Mater. Trans. A, Apr. 26, 2001, 32A; Idaho National Engineering and Environmental Laboratory, DOI 10.1007/s11661-001-0051-8, 15 pgs., Oct. 1, 2001.
Cadney et al., "Cold gas dynamic spraying as a method for freeforming and joining materials", Science Direct, Surface & Coatings Technology, Mar. 15, 2008, vol. 202, pp. 2801-2806.
Calin et al., "Improved mechanical behavior of Cu—Ti-based bulk metallic glass by in situ formation of nanoscale precipitates", Scripta Materialia, Mar. 17, 2003, vol. 48, pp. 653-658.
Chen et al., "Elastic Constants, Hardness and Their Implications to Flow Properties of Metallic Glasses", Journal of Non-crystalline Solids, Sep. 1, 1975, vol. 18, pp. 157-171.
Chen et al., "Formation of Micro-Scale Precision Flexures via Molding of Metallic Glass", Proceeding of the Annual Meeting of the ASPE, Monterey, CA, 2006, pp. 283-286.
Chen et al., "Influence of laser surface melting on glass formation and tribological behaviors of Zr55Al10Ni5Cu30 alloy", J. Mater Res. Oct. 28, 2011, vol. 26, No. 20, pp. 2642-2652.
Cheng, J. B. "Characterization of mechanical properties of FeCrBSiMn-NbY metallic glass coatings", J Mater Sci., Apr. 16, 2009, vol. 44, pp. 3356-3363.
Cheng et al., "Correlation of the microstructure and mechanical properties of Zr-based in-situ bulk metallic glass matrix composites", Intermetallics, Sep. 24, 2010, vol. 18, Issue 12, pp. 2425-2430.
Choi et al., "Tribological behavior of the kinetic sprayed $Ni_{59}Ti_{16}Zr_{20}Si_2Sn_3$", Journal of Alloys and Compounds, May 31, 2007, vol. 434-435, pp. 64-67.
Conner et al., "Shear band spacing under bending of Zr-based metallic glass plates", Acta Materialia, Jan. 27, 2004, vol. 52, pp. 2429-2434.
Conner et al., "Shear bands and cracking of metallic glass plates in bending", Journal of Applied Physics, Jul. 15, 2003, vol. 94, No. 2, pp. 904-911.
Dai et al., "A new centimeter-diameter Cu-based bulk metallic glass", Scripta Materialia, Jan. 20, 2006, vol. 54, pp. 1403-1408.
Dai et al., "High-performance bulk Ti—Cu—Ni—Sn—Ta nanocomposites based on a dendrite-eutectic microstructure", Journal of Materials Research, Sep. 2004, vol. 19, No. 9, pp. 2557-2566.
Davis, "Hardness/Strength Ratio of Metallic Glasses", Scripta Metallurgica, Feb. 18, 1975, vol. 9, pp. 431-436.
De Beer et al., "Surface Folds Make Tears and Chips", Physics, Sep. 4, 2012, vol. 100, 3 pgs.
Demetriou et al., "Glassy steel optimized for glass-forming ability and toughness", Applied Physics Letters, Jul. 31, 2009, vol. 95; pp. 041907-1-041907-3; http://idx.doi.org/10.1063/1.3184792.
Dislich et al., "Amorphous and Crystalline Dip Coatings Obtained from Organometallic Solutions: Procedures, Chemical Processes and Products", Metallurgical and Protective Coatings, Mar. 6, 1981, vol. 77, pp. 129-139.
Duan et al., "Lightweight Ti-based bulk metallic glasses excluding late transition metals", Scripta Materialia, Mar. 2008, vol. 58, pp. 465-468.
Duan et al., "Tribological properties of $Zr_{41.25}Ti_{13.75}Ni_{10}Cu_{12.5}Be_{22.5}$ bulk metallic glasses under different conditions", Journal of Alloys and Compounds, Mar. 2, 2012, vol. 528, pp. 74-78.
Fan et al., "Metallic glass matrix composite with precipitated ductile reinforcement", Applied Physics Letters, Aug. 5, 2002, vol. 81, Issue 6, pp. 1020-1022.
Fleury et al., "Tribological properties of bulk metallic glasses", Materials Science and Engineering, Jul. 2004, vol. A375-377, pp. 276-279.
Fornell et al., "Enhanced mechanical properties and in vitro corrosion behavior of amorphous and devitrified $Ti_{40}Zr_{10}Cu_{38}Pd_{12}$ metallic glass", Journal of the Mechanical Behavior of Biomedical Materials, May 27, 2011, vol. 4, pp. 1709-1717.
Fu et al., "Sliding behavior of metallic glass Part I. Experimental investigations", Wear, Oct. 2001, vol. 250, pp. 409-419.

(56) References Cited

OTHER PUBLICATIONS

Ganesan et al., "Bonding behavior studies of cold sprayed copper coating on the PVC polymer substrate", Surface & Coatings Technology, Jul. 10, 2012, vol. 207, pp. 262-269.
Garrett et al., "Effect of microalloying on the toughness of metallic glasses", Applied Physics Letter, Dec. 12, 2012, vol. 101, 241913-1-241913-3.
Gleason Corporation, "Gear Product News", Introducing genesis, the Next Generation in Gear Technology, Apr. 2006, 52 pgs.
Gloriant, "Microhardness and abrasive wear resistance of metallic glasses and nanostructured composite materials", Journal of Non-Crystalline Solids, Feb. 2003, vol. 316, pp. 96-103.
Greer, "Partially or fully devitrified alloys for mechanical properties", Materials and Science and Engineering, May 31, 2001, vol. A304, pp. 68-72.
Greer et al., "Wear resistance of amorphous alloys and related materials", International Materials Reviews, Apr. 1, 2002, vol. 47, No. 2, pp. 87-112.
Guo et al., "Tensile ductility and necking of metallic glass", Nature Materials, Oct. 2007, vol. 6, pp. 735-739.
Ha et al., "Tensile deformation behavior of two Ti-based amorphous matrix composites containing ductile β dendrites", Materials Science and Engineering: A, May 28, 2012, vol. 552, pp. 404-409.
Hale, "Principles and Techniques for Designing Precision Machines", Ph.D. Thesis, Feb. 1999, 493 pgs.
Harmon et al., "Anelastic to Plastic Transition in Metallic Glass-Forming Liquids", Physical Review Letters, Sep. 28, 2007, vol. 99, 135502-1-135502-4.
Haruyama et al., "Volume and enthalpy relaxation in $Zr_{55}Cu_{30}Ni_5Al_{10}$ bulk metallic glass", Acta Materialia, Mar. 2010, vol. 59, pp. 1829-1836.
Hays, C. C. "Microstructure Controlled Shear Band Pattern Formation and Enhanced Plasticity of Bulk Metallic Glasses Containing in situ Formed Ductile Phase Dendrite Dispersions", Physical Review Letters, Mar. 27, 2000, vol. 84, pp. 2901-2904.
He et al., "Novel Ti-base nanostructure-dendrite composite with enhanced plasticity", Nature Materials, Jan. 2003, Published Dec. 8, 2002, vol. 2, pp. 33-37, doi: 10.1038/nmat792.
Hejwowski et al., "A comparative study of electrochemical properties of metallic glasses and weld overlay coatings", Vacuum, Feb. 2013, vol. 88, pp. 118-123, Feb. 20, 2012.
Hofmann, "Bulk Metallic Glasses and Their Composites: A Brief History of Diverging Fields", Journal of Materials, Jan. 2013, vol. 2013, 7 pgs.
Hofmann, "Shape Memory Bulk Metallic Glass Composites", Science, Sep. 10, 2010, vol. 329, pp. 1294-1295.
Hofmann, D. C. "Development of tough, low-density titanium-based bulk metallic glass matrix composites with tensile ductility", PNAS, Dec. 23, 2008, vol. 105, pp. 20136-20140.
Hofmann et al., "Designing metallic glass matrix composites with high toughness and tensile ductility", Nature Letters, Feb. 28, 2008, vol. 451, pp. 1085-1090.
Hofmann et al., "Improving Ductility in Nanostructured Materials and Metallic Glasses: Three Laws", Material Science Forum, vol. 633-634, 2010, pp. 657-663, published online Nov. 19, 2009.
Hofmann et al., "Semi-solid Induction Forging of Metallic Glass Matrix Composites", JOM, Dec. 2009, vol. 61, No. 12, pp. 11-17, plus cover.
Extended European Search Report for European Application No. 14889035.3, Search completed Dec. 4, 2017, dated Dec. 13, 2017, 10 Pgs.
International Preliminary Report on Patentability for International Application PCT/US2013/047950, dated Dec. 31, 2014, Mailed Jan. 8, 2015, 7 Pgs.
International Preliminary Report on Patentability for International Application PCT/US2013/050614, dated Jan. 20, 2015, Mailed Jan. 29, 2015, 9 Pgs.
International Preliminary Report on Patentability for International Application PCT/US2014/033510, dated Oct. 12, 2016, Mailed Oct. 20, 2016, 9 Pgs.
International Preliminary Report on Patentability for International Application PCT/US2014/056615, dated Mar. 22, 2016, Mailed Mar. 31, 2016, 11 Pgs.
International Search Report and Written Opinion for International Application No. PCT/US2013/050614, Completed May 7, 2014, dated May 7, 2014, 12 pgs.
International Search Report and Written Opinion for International Application PCT/US2013/047950, completed Oct. 8, 2013, dated Oct. 10, 2013, 9 pgs.
International Search Report and Written Opinion for International Application PCT/US2014/033510, completed Jan. 8, 2015, dated Jan. 8, 2015, 11 Pgs.
International Search Report and Written Opinion for International Application PCT/US2014/056615, completed Dec. 29, 2014, dated Dec. 30, 2014, 13 Pgs.
"Corrosion of Titanium and Titanium Alloys", Total Materia., printed Feb. 16, 2016 from http://www.totalmateria.com/Article24.htm, published Sep. 2001, 4 pgs.
"Gear", Dictionary.com. Accessed Aug. 30, 2016.
"Group 4 element", Wkipedia. https://en.wikipedia.org/wiki/Group_4_element. Published Jun. 11, 2010. Accessed Aug. 24, 2016.
"Harmonic Drive AG", website, printed from http://harmoncdrive.aero/?idcat=471, Feb. 20, 2014, 2 pgs.
"Harmonic Drive Polymer GmbH", printed Feb. 20, 2014 from http://www.harmonicdrive.de/English/the-company/subsidiaries/harmonic-drive-polymer-gmbh.html, 1 pg.
"Introduction to Thermal Spray Processing", ASM International, Handbook of Thermal Spray Technology (#06994G), 2004, 12 pgs.
Abdeljawad et al., "Continuum Modeling of Bulk Metallic Glasses and Composites", Physical Review Letters, vol. 105, 205503, Sep. 17, 2010, pp. 125503-1-125503-4.
Abrosimova et al., "Crystalline layer on the surface of Zr-based bulk metallic glasses", Journal of Non-Crystalline solids, Mar. 6, 2001, vol. 288, pp. 121-126.
An et al., "Synthesis of single-component metallic glasses by thermal spray of nanodroplets on amorphous substrates", Applied Physics Letters, Jan. 26, 2012, vol. 100, pp. 041909-1-041909-4.
Anstis et al., "A Critical Evaluation of Indentation Techniques for Measuring Fracture Toughness: I, Direct Crack Measurements", Journal of American Ceramic Society, Sep. 1, 1981, vol. 64, No. 8, pp. 533-538.

SYSTEMS AND METHODS FOR ADDITIVE MANUFACTURING PROCESSES THAT STRATEGICALLY BUILDUP OBJECTS

CROSS-REFERENCE TO RELATED APPLICATIONS

The current application is a divisional of U.S. application Ser. No. 14/332,187, filed Jul. 15, 2014, which application claims priority to U.S. Provisional Patent Application No. 61/846,501, filed Jul. 15, 2013, the disclosures of which are hereby incorporated by reference in their entireties.

STATEMENT OF FEDERAL FUNDING

The invention described herein was made in the performance of work under a NASA contract, and is subject to the provisions of Public Law 96-517 (35 USC 202) in which the Contractor has elected to retain title.

FIELD OF THE INVENTION

The present invention generally relates to additive manufacturing apparatuses and techniques.

BACKGROUND

'Additive manufacturing,' or '3D Printing,' is a term that typically describes a manufacturing process whereby a 3D model of an object to be fabricated is provided to an apparatus (e.g. a 3D printer), which then autonomously fabricates the object by gradually depositing, or otherwise forming, the constituent material in the shape of the object to be fabricated. For example, in many instances, successive layers of material that represent cross-sections of the object are deposited or otherwise formed; generally, the deposited layers of material fuse (or otherwise solidify) to form the final object. Because of their relative versatility, additive manufacturing techniques have generated much interest

SUMMARY OF THE INVENTION

Systems and methods in accordance with embodiments of the invention implement additive manufacturing techniques that employ different sets of deposition characteristics and/or material formation characteristics during the additive manufacture of an object so as to strategically build up the object. In many embodiments, material used to build up an object is deposited at different deposition rates during the additive manufacture of the object, and the object is thereby strategically built up. In one embodiment, a method of additively manufacturing an object includes: depositing material onto a surface at a first deposition rate so as to define a first region of the object to be additively manufactured; and depositing material onto a surface at a second deposition rate so as to define a second region of the object to be additively manufactured; where the second deposition rate is different from the first deposition rate.

In another embodiment, the first deposition rate is achieved by using a first deposition geometry and the second deposition rate is achieved by using a second, different, deposition geometry.

In yet another embodiment, the first region of the object includes intricate features; the second region includes blunt portions; and the second deposition rate is greater than the first deposition rate.

In still another embodiment, the first region defines a boundary surface that is to exist within the object to be additively manufactured; and the second region is a volume that is enclosed by the first region.

In yet still another embodiment, depositing material so as to define the first region occurs prior to depositing material so as to define the second region.

In a further embodiment, the first deposition rate is achieved by using point deposition; and the second deposition rate is achieved by using one of: surface deposition and volume deposition.

In a still further embodiment, any implemented surface deposition is effected by one of: depositing material in a ribbon format, and depositing material by spraying material; and any implemented volume deposition is effected by pouring material.

In a yet further embodiment, spraying material comprises one of: spraying polymer and thermal spray coating metal.

In a yet still further embodiment, the second region is defined by the entire volume enclosed by the first region.

In another embodiment, a method of additively manufacturing an object further includes, conforming the material deposited so as to define the second region to at least some portion of the boundary surface.

In yet another embodiment, the conforming is accomplished using a mechanical tool.

In still another embodiment, the second region defines at least the majority of the outer surface of the desired object.

In yet still another embodiment, the material deposited so as to define the first region of the object is different than the material deposited so as to define the second region of the object.

In a further embodiment, either the material deposited so as to define a first region of the object or the material deposited so as to define the second region of the object comprises a metallic glass-based material.

In a yet further embodiment, an additive manufacturing apparatus includes: a nozzle configured to deposit material in accordance with a first set of deposition characteristics; and a nozzle configured to deposit material in accordance with a second set of deposition characteristics.

In a still further embodiment, the nozzle configured to deposit material in accordance with a first set of deposition characteristics is also configured to deposit material in accordance with a second set of deposition characteristics.

In a still yet further embodiment, the nozzle includes an opening through which material can be extruded, wherein the geometry of the opening can be varied.

In another embodiment, the geometry of the opening is a slit with a variable length.

In yet another embodiment, the nozzle is configured to deposit material by spraying material onto a surface, wherein the spray radius can be adjusted.

In still another embodiment, the nozzle is configured to deposit material by one of: spraying polymer and thermal spray coating metal.

In still yet another embodiment, the nozzle that is configured to deposit material in accordance with a first set of deposition characteristics is a first nozzle that is different than the nozzle that is configured to deposit material in accordance with a second set of deposition characteristics, which is a second nozzle.

In a further embodiment, the first nozzle is a point source; and the second nozzle is one of: a surface source and a volume source.

In a yet further embodiment, the first nozzle is configured to deposit a ribbon of material having a first width and the second nozzle is configured to deposit a ribbon of material having a second, different, width.

In a still yet further embodiment, the first nozzle is associated with a first feedstock source and the second nozzle is associated with a second feedstock source wherein the first feedstock source is different than the second feedstock source.

In another embodiment, an additive manufacturing apparatus further includes a mechanical tool that is configured to conform deposited material to a surface.

In yet another embodiment, an additive manufacturing apparatus further includes a curing subassembly that is configured to cure deposited material.

In still another embodiment, a method of additively manufacturing an object using a plurality of different sets of deposition characteristics includes: receiving a 3-dimensional model of a desired object using a manufacturing controller; determining a strategy for additively manufacturing the object that includes employing a plurality of different sets of deposition characteristics during the additive manufacture of the object using the manufacturing controller; and instructing an additive manufacturing apparatus to additively manufacture the object in accordance with the developed additive manufacturing strategy using the manufacturing controller.

In still yet another embodiment, the plurality of different sets of deposition characteristics are based on the different sets of deposition characteristics available in the additive manufacturing apparatus.

In a further embodiment, the plurality of different sets of deposition characteristics include different deposition rates.

In a yet further embodiment, the plurality of different sets of deposition characteristics include different deposition geometries.

In a still further embodiment, determining the additive manufacturing strategy includes: identifying at least a first region of the received model that contains intricate features; identifying at least a second region of the received model that contains blunt portions; and determining an additive manufacturing strategy that includes using a first deposition rate to fabricate the first region and a second, faster, deposition rate to fabricate the second region.

In a still yet further embodiment, determining the additive manufacturing strategy includes: identifying at least a first boundary surface in the model; identifying at least a first interior volume enclosed by the first boundary surface; and determining an additive manufacturing strategy that includes using a first deposition rate to fabricate the boundary surface and a second, faster, deposition rate to fabricate the first interior volume.

In another embodiment, an additive manufacturing apparatus system includes: an additive manufacturing apparatus that is configured to implement multiple sets of deposition characteristics during the additive manufacture of an object, memory that comprises an additive manufacturing apparatus controller application, and a processor configured by the additive manufacturing apparatus controller application to: receive a 3-dimensional model of a desired object; determine a strategy for additively manufacturing the object that includes employing a plurality of different sets of deposition characteristics during the additive manufacture of the object; and instruct the additive manufacturing apparatus to additively manufacture the object in accordance with the determined additive manufacturing strategy.

In yet another embodiment, the plurality of different sets of deposition characteristics are based on the different sets of deposition characteristics available in the additive manufacturing apparatus.

In still another embodiment, the plurality of different sets of deposition characteristics include different deposition rates.

In still yet another embodiment, the plurality of different sets of deposition characteristics include different deposition geometries.

In a further embodiment, determining the additive manufacturing strategy includes: identifying at least a first region of the received model that contains intricate features; identifying at least a second region of the received model that contains blunt portions; and determining an additive manufacturing strategy that includes using a first deposition rate to fabricate the first region and a second, faster, deposition rate to fabricate the second region.

In a yet further embodiment, determining the additive manufacturing strategy includes: identifying at least a first boundary surface in the model; identifying at least a first interior volume enclosed by the first boundary surface; and determining an additive manufacturing strategy that includes using a first deposition rate to fabricate the boundary surface and a second, faster, deposition rate to fabricate the first interior volume.

In a still yet further embodiment, a machine readable medium containing processor instructions, where execution of the instructions by a processor causes the processor to perform a process comprising: receiving a 3-dimensional model of a desired object; determining a strategy for additively manufacturing the object that includes employing a plurality of different sets of deposition characteristics during the additive manufacture of the object; and instructing an additive manufacturing apparatus to additively manufacture the object in accordance with the developed additive manufacturing strategy.

In another embodiment, the plurality of different sets of deposition characteristics are based on the different sets of deposition characteristics available in a given additive manufacturing apparatus.

In yet another embodiment, the plurality of different sets of deposition characteristics include different deposition rates.

In still another embodiment, the plurality of different sets of deposition characteristics include different deposition geometries.

In a still yet another embodiment, determining the additive manufacturing strategy includes: identifying at least a first region of the received model that contains intricate features; identifying at least a second region of the received model that contains blunt portions; and determining an additive manufacturing strategy that includes using a first deposition rate to fabricate the first region and a second, faster, deposition rate to fabricate the second region.

In a further embodiment, determining the additive manufacturing strategy includes: identifying at least a first boundary surface in the model; identifying at least a first interior volume enclosed by the first boundary surface; and determining an additive manufacturing strategy that includes using a first deposition rate to fabricate the boundary surface and a second, faster, deposition rate to fabricate the first interior volume.

DETAILED DESCRIPTION

Figure 1:
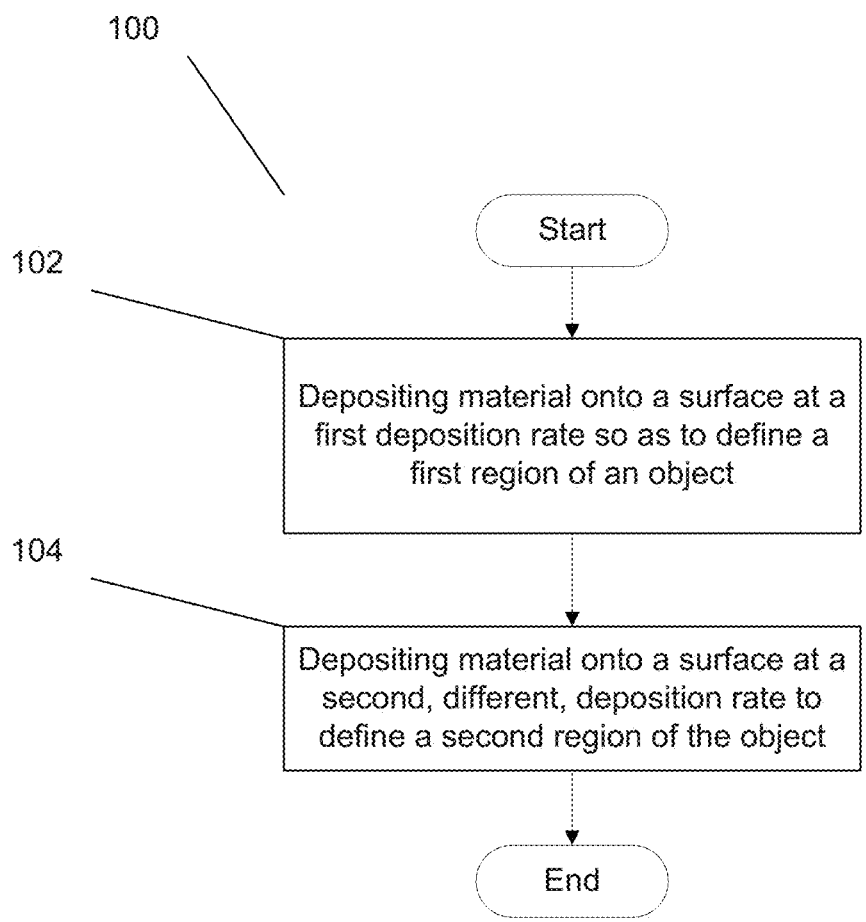
FIG. 1 illustrates a method of additively manufacturing an object using at least two different deposition rates in accordance with an embodiment of the invention.

Turning now to the drawings, systems and methods for implementing additive manufacturing techniques that employ different sets of deposition characteristics and/or material formation characteristics during the buildup of a desired object are illustrated. In the context of this application, a set of deposition characteristics and/or material formation characteristics can be understood to mean those characteristics that characterize the deposition and/or material formation that occur during the additive manufacture of an object. For example, a set of deposition characteristics can include the deposition rate and deposition geometry that characterize how a nozzle deposits material in accordance with an additive manufacturing process. A first set of deposition characteristics (and/or material formation) can be understood to be different than a second set of deposition characteristics (and/or material formation) if the first set contains at least one characteristic (e.g. a rate of deposition/material formation) that is different than the corresponding characteristic in the second set. In many embodiments, different rates of deposition and/or material formation are employed during the additive manufacture of a desired object. In a number of embodiments, the deposition and/or material formation geometry is altered during the additive manufacture of an object. In numerous embodiments, the change in the deposition geometry and/or material formation geometry alters the deposition rate and/or material formation rate during the manufacture of the desired object.

Since its inception, additive manufacturing, or '3D Printing', has generated much interest from manufacturing communities because of the seemingly unlimited potential that these fabrication techniques can offer. For example, these techniques have been demonstrated to produce any of a variety of distinct and intricate geometries, with the only input being the final shape of the object to be formed. In many instances, a 3D rendering of an object is provided electronically to a '3D Printer', which then fabricates the object. Many times, a 3D Printer is provided with a CAD File, a 3D Model, or instructions (e.g. via G-code), and the 3D Printer thereby fabricates the object. Importantly, as can be inferred, these processing techniques can be used to avoid heritage manufacturing techniques that can be far more resource intensive and inefficient. The relative simplicity and versatility of this process can pragmatically be used in any of a variety of scenarios. It should also be mentioned that the cost of 3D printers has recently noticeably decreased, thereby making additive manufacturing processes an even more viable fabrication methodology.

Given the demonstrated efficacy and versatility of additive manufacturing processes, their potential continues to be explored. For instance, while current additive manufacturing processes are typically based on the deposition/forming of conventional metals and/or polymers, there have been efforts to broaden the material selection from which to additively manufacture objects. For example, in U.S. patent application Ser. No. 14/163,936 entitled "Systems and Methods for Fabricating Objects Including Amorphous Metal Using Techniques Akin to Additive Manufacturing" to Hofmann, techniques for additively manufacturing objects from metallic glass-based materials are disclosed. The disclosure of U.S. patent application Ser. No. 14/163,936 is herein incorporated by reference in its entirety. Similarly, in U.S. patent application Ser. No. 14/259,608 entitled "Systems and Methods for Fabricating Structures Including Metallic Glass-Based Materials Using Ultrasonic Welding" to Hofmann et al., techniques for using ultrasonic welding to additively manufacture objects from metallic glass-based materials are disclosed. The disclosure of U.S. patent application Ser. No. 14/259,608 is herein incorporated by reference in its entirety.

Additionally, although additive manufacturing processes demonstrate desirable versatility, there exists room for improvement with respect to the rate and efficiency at which these processes fabricate objects. Generally, additive manufacturing processes build up an object by effectively 'raster scanning' a nozzle head that deposits, or otherwise forms, the material for each layer of the object. In effect, the object is built up by sequentially depositing, or otherwise forming, a nominal portion of the object until it is fully developed. As can be appreciated, this can be a time consuming process. This is particularly the case given the overall favor of 3d printers having 'increased resolution'—increasing the resolution of 3d printers effectively amounts to decreasing the amount of material deposited/formed as the nozzle head 'raster scans' to create the desired object. In other words, for a given raster-scanned path traversal, a 3d printer having increased resolution deposits/forms a lesser amount of material. This can allow objects having relatively finer and more intricate features to be additively manufactured, but at the expense of the rate of fabrication.

Against this background, there have been some efforts to develop additive manufacturing techniques to expedite the fabrication rates of conventional additive manufacturing processes. For example, in U.S. patent application Ser. No. 14/196,628 entitled "Systems and Methods Implementing Additive Manufacturing Processes that Utilize Multiple Build Heads", Hofmann et al. disclose additive manufacturing apparatus that include multiple nozzle heads attached to a single translation system such that each nozzle head traverses a similar path during the build up of a desired object; as a result, multiple objects can be simultaneously fabricated. The disclosure of U.S. patent application Ser. No. 14/196,628 is hereby incorporated by reference in its entirety.

Nonetheless, even with these laudable achievements, the state of the art can further benefit from the development of methods that can enable the efficient build up of objects. Accordingly, in many embodiments, different sets of deposition and/or material formation characteristics are implemented during the additive manufacture of an object so as to strategically build up the object. For instance, in many embodiments, methods of additively manufacturing an object are implemented where the rate of material deposition/formation is strategically varied so as to build up an object at a relatively more rapid rate. For example, in some embodiments, the intricate portions of an object are built up by depositing/forming material more meticulously, while the blunt portions of the object are built up by depositing/forming material at a more rapid rate. In some embodiments, a bounding surface of an object to be fabricated is meticulously built up in accordance with an additive manufacturing process, and the interior volume is thereafter formed by depositing/forming material within the bounding surface at a bulk rate. Note that throughout the application, references to material 'deposition/formation' are meant to regard the material that solidifies during an additive manufacturing process and thereby facilitates the fabrication of a desired object, unless otherwise stated.

In many embodiments, the geometry of the material as it is deposited/formed is controlled so as to make the additive manufacturing process more efficient. In numerous embodiments, the geometry of the deposited/formed material is controlled so as to control the rate of deposition/formation. For instance, in many embodiments, where it is desired that certain portions of an additively manufactured object be built up carefully, nominal amounts of material can be meticulously deposited/formed; conversely, where it is desired that a comparatively greater amount of material be deposited/formed, a planar ribbon of material can be deposited/formed. Similarly, where it is desired that an even greater amount of material be deposited to form the object, then the material can be deposited/formed in bulk. In this paradigm, the deposition/formation of a nominal amount of material (e.g. like the amount of material deposited by conventional additive manufacturing apparatuses) can be understood to be 'point deposition/formation' or else deposition/formation by a 'point source'; the deposition/formation of material in a planar format can be understood to be 'surface deposition', or else deposition/formation by a 'surface source', and the deposition/formation of material in a bulk format (e.g. where the material has non-negligible length in each of three dimensions as it is being deposited) can be understood to be 'volume deposition/formation', or else deposition/formation by a volume source.

Note that these techniques can be implemented in conjunction with existing additive manufacturing processes such as for example direct metal laser sintering (DMLS), laser engineered net shaping (LENS), and electron beam freeform fabrication techniques ($EBF^3$). By way of background, in DMLS additive manufacturing, a bed of feedstock metallic powder is spread over a substrate, and a build head is used to heat, and thereby form, a layer of the structure to be formed; after that layer of the structure is formed, a subsequent bed of feedstock metallic powder is deposited, and the next structural layer is formed. This process iterates until the final structure is formed; any excess feedstock metallic powder is removed. In LENS additive manufacturing, a feedstock metallic powder is provided to a build head that heats and deposits the feedstock metal into the shape of the structure to be formed. $EBF^3$ additive manufacturing processes are similar to LENS additive manufacturing processes, except that feedstock metal is in the form of wire, and an electron beam is typically used to heat the wire. Of course, while metal-based additive manufacturing technologies are discussed, the above described techniques can be implemented in conjunction with polymer-based additive manufacturing processes as well. Indeed, the above-described additive manufacturing techniques can be incorporated in conjunction with any suitable additive manufacturing process and in conjunction with any suitable material (e.g. ceramics and waxes), and is not so constrained.

In many embodiments, additive manufacturing apparatuses are implemented that have the capability of varying the material deposition/formation characteristics during the additive manufacture of an object. In numerous embodiments, additive manufacturing apparatuses are implemented that can deposit/form material at different deposition/formation rates. For example, in some embodiments, an additive manufacturing apparatus includes multiple nozzle heads, each of which being capable of depositing/forming material at a different rate of deposition/formation. For instance, in some embodiments, an additive manufacturing apparatus includes a nozzle that is configured to implement point deposition/formation; a nozzle head that is configured to implement surface deposition/formation; and a nozzle head that is configured to implement volume deposition/formation.

In a number of embodiments, processes are implemented that develop an additive manufacturing strategy—based on varying the deposition/formation characteristics during the additive manufacturing process—for a given object to be fabricated. These processes can be implemented by any of a variety of computation devices, and can thereby be implemented as software. The processes can further include instructing the operation of additive manufacturing apparatuses that are capable of depositing/forming material using different sets of deposition characteristics so that a desired object is additively manufactured in accordance with the determined additive manufacturing strategy. These methods, systems, and processes are now discussed in greater detail below.

Additive Manufacturing Methods Based on Different Material Deposition/Formation Rates In many embodiments, material deposition/formation characteristics in an additive manufacturing process are varied so as to efficiently build up a desired object. In a number of embodiments, the rate of the material deposition/formation and/or the geometry of material deposition/formation is varied during the buildup of an object during an additive manufacturing process. The material deposition/formation characteristics can be varied based on the geometry of the object to be fabricated. For example, where an object includes both intricate features and blunt portions, the additive manufacture of the object can include additively manufacturing the intricate features using deposition/formation characteristics that can allow the intricate features to be carefully developed, and—during the same additive manufacturing process—can further include using distinctly different deposition/formation characteristics that can allow the blunt portions, which may not require as much care, to be more rapidly developed.

FIG. 1 illustrates a method of additively manufacturing an object that employs different deposition rates to efficiently build up the object in accordance with an embodiment of the invention. In particular, the method 100 includes depositing (102) material onto a surface at a first deposition rate in accordance with an additive manufacturing process so as to define a first region of the object, and depositing (104) material onto a surface at a second, different, deposition rate as part of the same additive manufacturing process. As alluded to above, the different deposition rates can be based on the geometry of the object to be fabricated. For example, a slower, more meticulous, deposition rate can be implemented to develop a first region that includes the intricate features of the desired object, whereas a more rapid deposition rate can be implemented to build up the second region that includes the blunt portions of the fabricated object. Intricate features can be characterized in that they possess at least some characteristic dimension (e.g. length, width, height) that is less than some determined threshold value. For instance in many embodiments, the determined threshold value is approximately 5 mm. Of course it should be clear that the determined threshold value can be any suitable threshold value. Blunt portions can be understood to mean portions that have at least two characteristic dimensions (e.g. length, width, height) that are each larger than determined respective threshold values. In many embodiments, the determined threshold value for each of the respective dimensions is 1 cm. Of course it should be clear that the determined threshold value can be any suitable threshold value.

As mentioned above, these techniques can be implemented in conjunction with any suitable additive manufacturing process. For example, they can be implemented in conjunction with a DMLS process: a fine sintering tool can be used to sinter the feedstock powder and thereby deposit material at a first deposition rate so as to define a first region of an object, and a different blunt tool can be used to sinter feedstock powder at a second, faster, deposition rate so as to define a second region of the object. Of course, as mentioned above, these techniques can be implemented in conjunction with any suitable additive manufacturing process, including for example LENS, $EBF^3$, polymer-based additive manufacturing processes, ceramic-based additive manufacturing processes, and wax-based additive manufacturing processes.

While the above discussion regards additive manufacturing processes implementing a plurality of deposition rates, a plurality of any suitable deposition characteristic can be implemented in accordance with embodiments of the invention. For example in many embodiments, additive manufacturing processes are implemented whereby at least two different deposition geometries are implemented. For instance, in some embodiments, material is deposited onto a surface using a first deposition geometry (e.g. a ribbon having a first width) to define a first region of an object, and material is deposited onto a surface using a second deposition geometry (e.g. a ribbon having a second width) to define a second region of the object. Moreover, as can be appreciated, the above-described method is broad and can be implemented in any number of ways. For example, in many embodiments, a boundary surface of an additively manufactured object is deposited, and an interior volume of the boundary surface is thereafter filled at a comparatively higher deposition rate—this aspect is now discussed in greater detail below.

Figure 2:
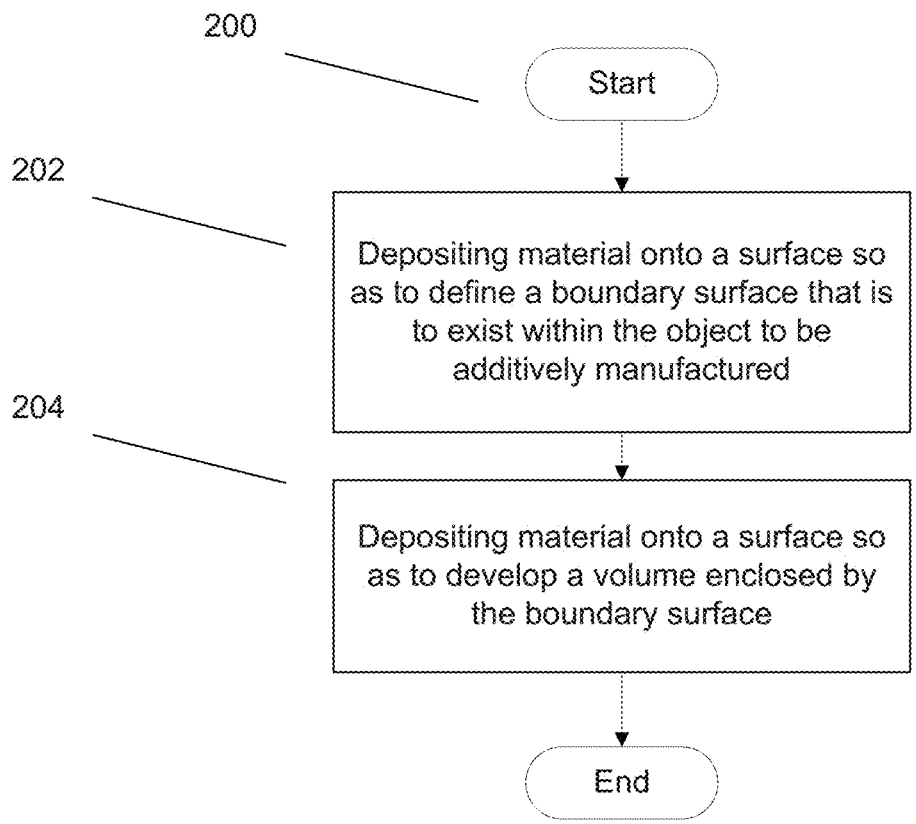
FIG. 2 illustrates a method of additively manufacturing an object by depositing material onto a surface so as to define a boundary surface, and thereafter filling an interior volume enclosed by the boundary surface in accordance with an embodiment of the invention.

Additive Manufacturing Methods that Include Forming a Boundary Surface and Thereafter Forming a Volume Enclosed by the Boundary Surface In many embodiments, an additive manufacturing method includes developing a boundary surface of the object to be fabricated, and thereafter developing a volume enclosed by the boundary surface with material. This method can greatly expedite the development of the interior volume. FIG. 2 depicts a method of additively manufacturing an object whereby a boundary surface is additively manufactured, and an interior volume within the boundary surface is thereafter filled. In particular, the method 200 includes depositing (202) material onto a surface so as to define a boundary surface that is to exist within the object to be additively manufactured. For example, a perimeter surface of a desired object can be manufactured. The method 200 further includes depositing (204) material onto a surface so as to develop a volume enclosed by the boundary surface. In effect, with the boundary surface defined, an interior volume within the boundary surface, the interior volume can be built up more rapidly, for example. In many instances, the interior volume that is developed is the entire volume enclosed by the boundary surface.

Figure 3A:
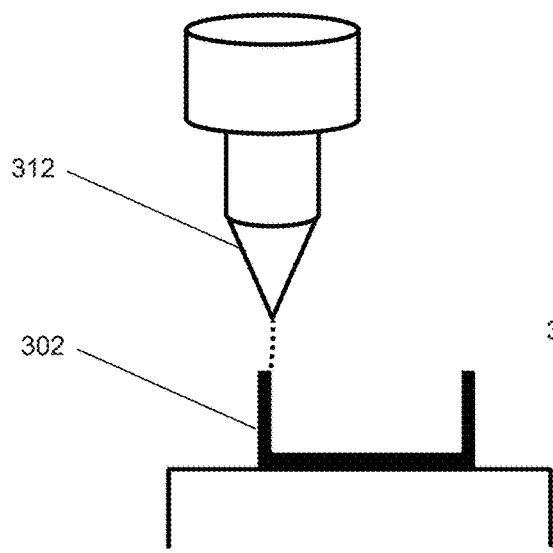
FIGS. 3A-3D illustrate the additive manufacture of an object by first depositing material onto a surface so as to define a boundary surface, and thereafter filling an interior volume enclosed by the boundary surface in accordance with an embodiment of the invention.
Figure 3B:
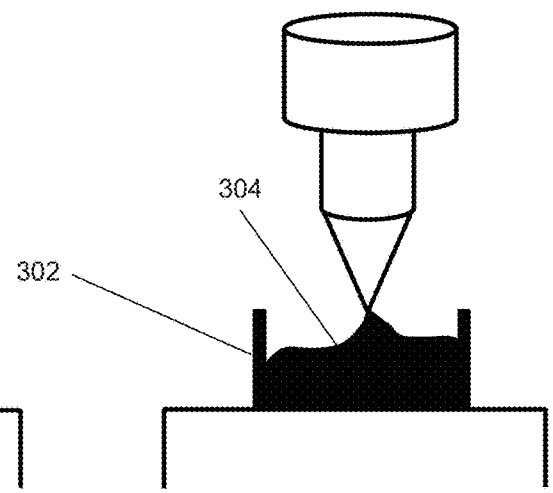
Figure 3C:
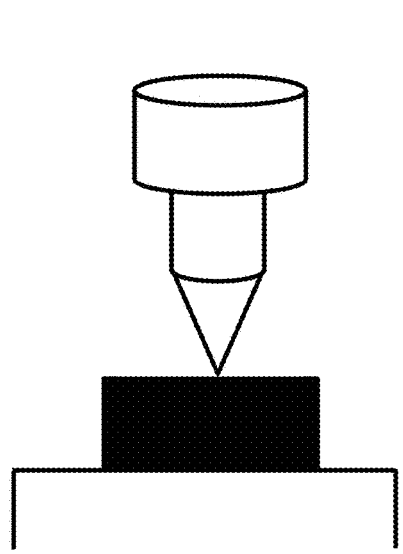
Figure 3D:
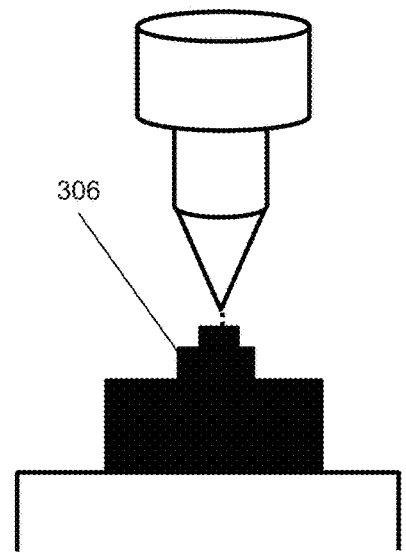

FIGS. 3A-3D illustrate the fabrication of an object consistent with the method described above with respect to FIG. 2 in accordance with an embodiment of the invention. In particular, FIG. 3A depicts the deposition of material so as to define a boundary surface 302 of the object to be fabricated. More specifically, FIG. 3A depicts that a nozzle 312 is carefully depositing material to build up the boundary surface 302. FIG. 3B depicts the deposition of material so as to build up the entire interior volume 304 defined by the boundary surface 302. Note that FIG. 3B depicts that material is being deposited at a relatively rapid rate—the temporary uneven nature of the deposition of the interior volume ultimately bears no consequence. FIG. 3C depicts that the volume has been filled, and this portion of the object has been fabricated. FIG. 3D depicts that more intricate features can thereafter be developed on the bulk developed region; at this point, the intricate features can be more carefully developed.

Figure 4A:
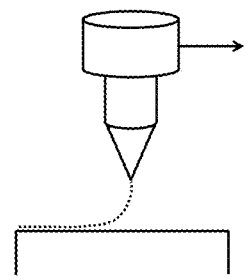
FIGS. 4A-4E illustrate various deposition techniques, each having a different set of deposition characteristics that can be implemented in accordance with embodiments of the invention.
Figure 4B:
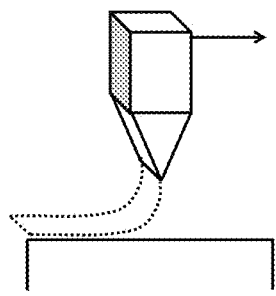
Figure 4C:
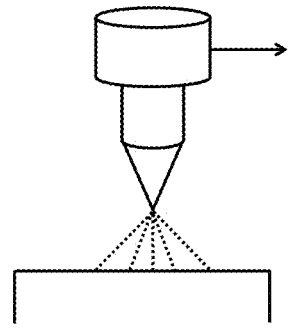
Figure 4D:
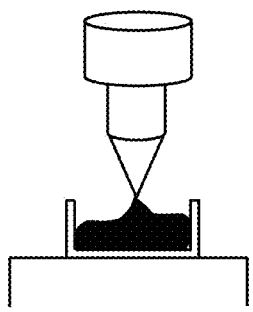
Figure 4E:
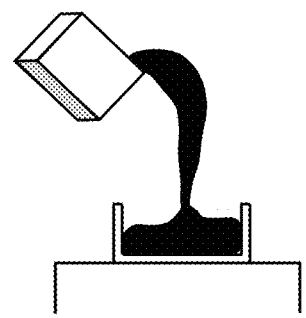

While the above methods have referenced implementing different deposition rates, note that the different deposition rates can be achieved in any of a number of ways. For instance, in many embodiments, the deposition rate is controlled by implementing a different deposition geometry. For example, FIGS. 4A-4E depict varying deposition characteristics that can impact the rate of deposition. In particular, FIG. 4A depicts using a nozzle head to deposit a nominal amount of material; this is similar to the way many conventional additive manufacturing apparatuses fabricate objects—in other words, the nozzle acts as a 'point source'. Any conventional nozzle head can be implemented as a point source in accordance with embodiments of the invention. FIG. 4B depicts using a nozzle head to deposit a ribbon of material; in other words, the nozzle is configured to implement 'surface deposition' and can be said to be acting as a 'surface source'. For example, in many embodiments, nozzle heads that are configured to deposit metals or metallic glass-based materials in a ribbon form factor and ultrasonically weld them (for example, using the techniques described in U.S. patent application Ser. No. 14/259,608, incorporated by reference above) may be utilized in accordance with certain embodiments. FIG. 4C depicts using a nozzle head to spray a material onto a surface—this nozzle too thereby implements surface deposition. For example, any of the spray-techniques described in U.S. patent application Ser. No. 14/163,936, incorporated by reference above, can be implemented, including, but not limited to, thermal spraying, high velocity oxy-fuel spraying, plasma spraying, wire arc spraying, and mixtures thereof. Of course the spraying of polymer may also be implemented. FIG. 4D depicts using a nozzle head to deposit material in bulk—'volume deposition'—and can be said to be acting as a 'volume source'. FIG. 4E depicts depositing material in bulk using a pouring mechanism. Of course, pouring mechanisms can be used in conjunction with any suitable material in accordance with embodiments of the invention. For example, in many embodiments, they are used in conjunction with one of molten bulk metallic-glass based compositions, molten metals, and molten polymers. As can be appreciated, any of the above-mentioned deposition devices can be incorporated in accordance with embodiments of the invention. More generally, any suitable deposition device can be incorporated in accordance with embodiments of the invention. Further, deposition devices can be used to deposit any suitable material, including but not limited to metals, polymers, ceramics, waxes, and metallic glass-based materials in accordance with embodiments of the invention. Indeed, in many embodiments, the additive manufacture of an object involves the deposition of a plurality of distinct materials. It should be reiterated that the described methods, systems, and processes are meant to be broad and can be implemented in conjunction with any of a variety of additive manufacturing processes.

Figure 5A:
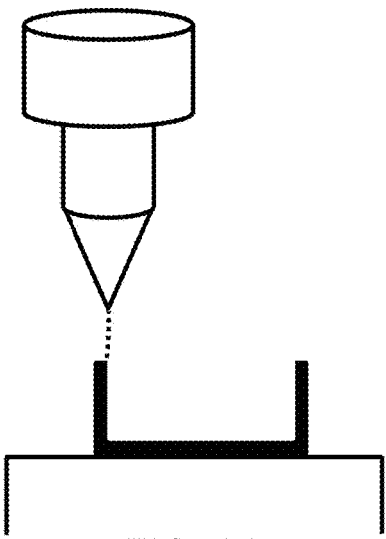
FIGS. 5A-5D illustrate the additive manufacture of an object by first depositing material onto a surface so as to define a boundary surface, and thereafter filling an interior volume enclosed by the boundary surface by spraying material in accordance with an embodiment of the invention.
Figure 5B:
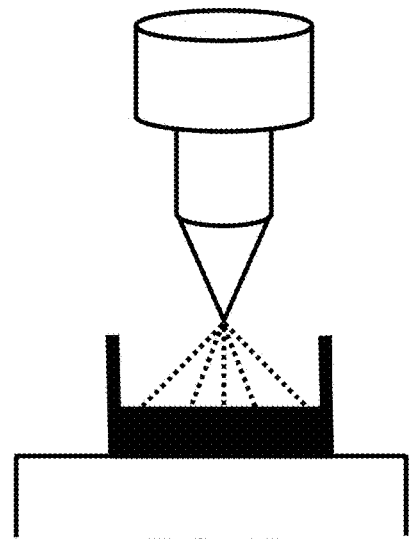
Figure 5C:
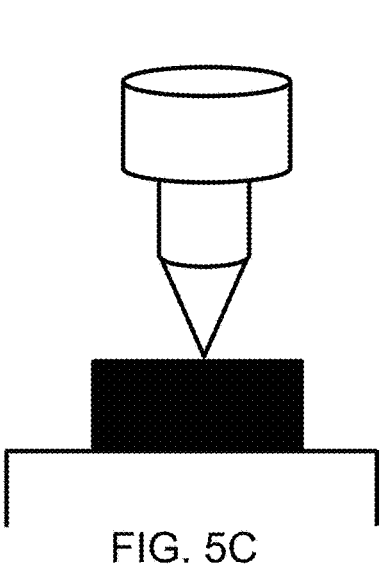
Figure 5D:
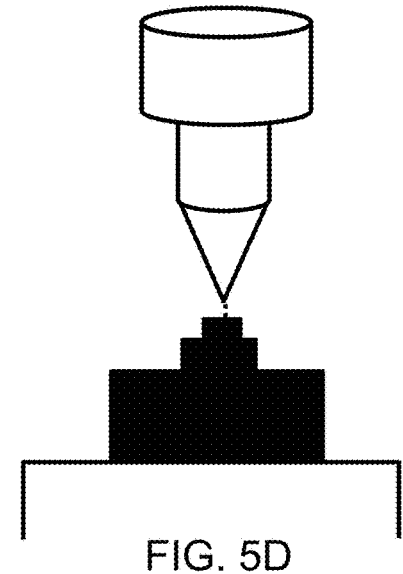

FIGS. 5A-5D depict additively manufacturing an object in accordance with the method described above with respect to FIG. 2. In particular, FIGS. 5A-5D are similar to FIGS. 3A-3D except that FIG. 5B depicts that material is sprayed into the interior volume. Of course, it should be appreciated that any way of depositing material into an interior volume enclosed by a boundary surface can be implemented in accordance with embodiments of the invention. For example, molten material can be poured into an interior volume enclosed by a boundary surface. As alluded to above, the molten material can be any suitable material, including for example a metallic glass-based composition, a metal, and a polymer. As can be appreciated, the after pouring, the molten material can be made to solidify using any suitable corresponding technique. For example, molten metallic glass-based material can be rapidly cooled using any suitable technique, e.g. conductive cooling through any adjacent bounding surface, cooling via convection, using a distinct cooling gas, etc.

Figure 6A:
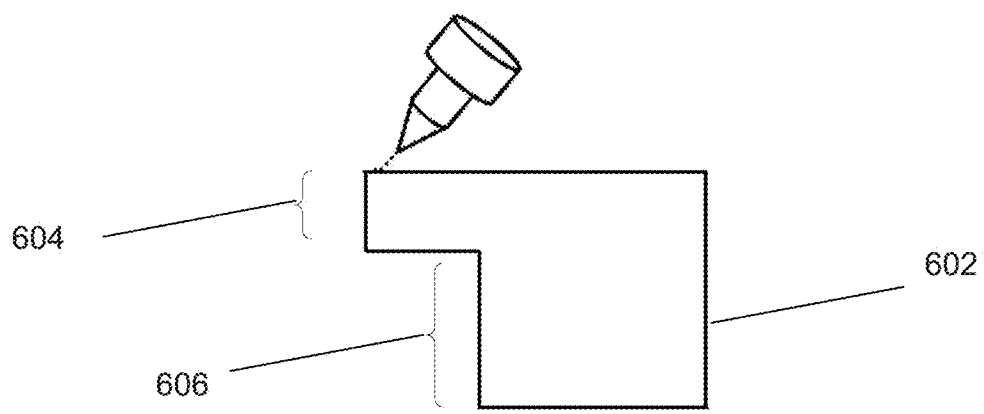
FIGS. 6A-6C illustrate the additive manufacture of an object by first depositing material onto a surface so as to define a boundary surface, and thereafter filling a first interior volume by depositing material in the form of a surface having a first width, and filling a second interior volume by depositing material in the form of a surface having a second width in accordance with an embodiment of the invention.
Figure 6B:
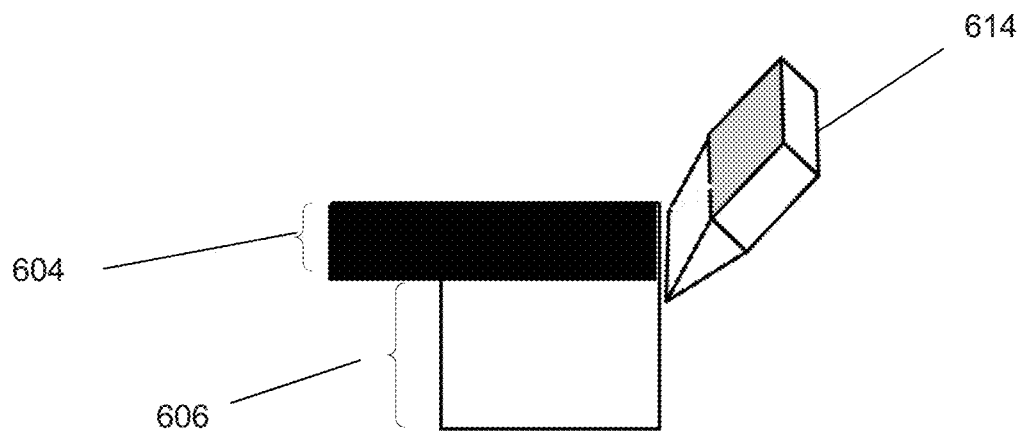
Figure 6C:
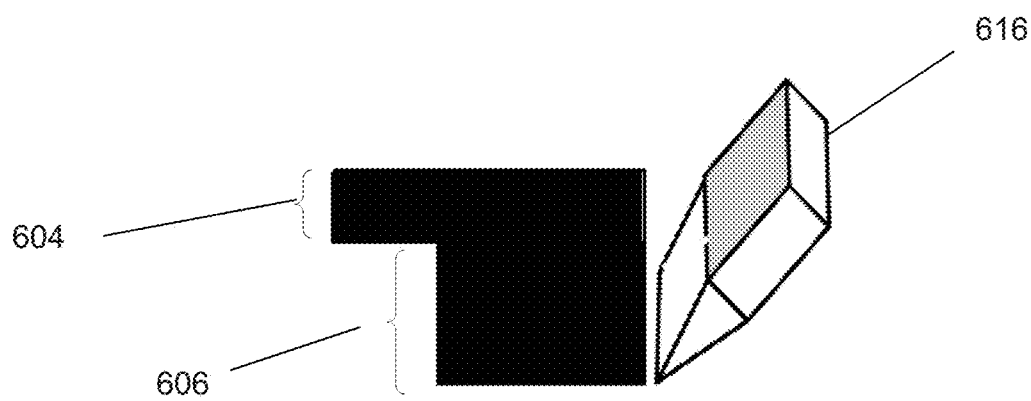

In many embodiments, a deposition geometry is applied such that it accommodates the geometry of the part to be fabricated. For instance, FIGS. 6A-6C depict depositing material based on the geometry of the desired object. In particular, in the illustrated embodiment, the object is fabricated in accordance with the description above with respect to FIG. 2. Specifically, FIG. 6A depicts that a boundary surface 602 of the object to be manufactured is fabricated. Note that the object has a thin portion 604 and a wide portion 606. FIG. 6B depicts a surface deposition is used to develop the internal volume that corresponds with the thin portion 602 of the object. More specifically, a nozzle 614 that is a surface source is depositing a ribbon having a width that accommodates the thin portion 602. FIG. 6C depicts a surface deposition by a nozzle 616 that deposits a ribbon of material having a width that accommodates the wide portion 606. In effect, by conforming the deposition geometry to the geometry of a desired object, its manufacture can be made to be more efficient.

Figure 7A:
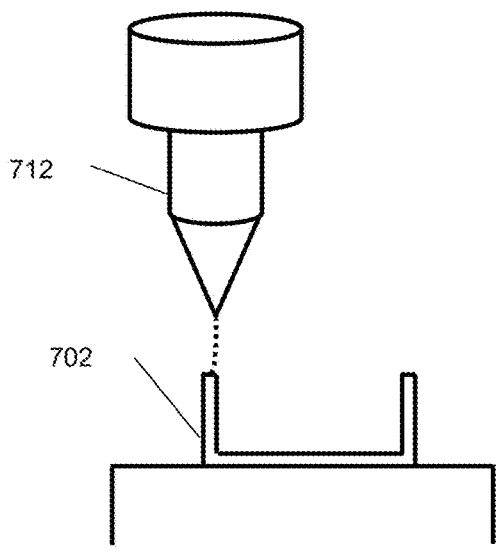
FIGS. 7A-7D illustrate the additive manufacture of an object by first depositing material onto a surface so as to define a boundary surface, filling an interior volume enclosed by the boundary surface, and removing the material defining the interior volume in accordance with an embodiment of the invention.
Figure 7B:
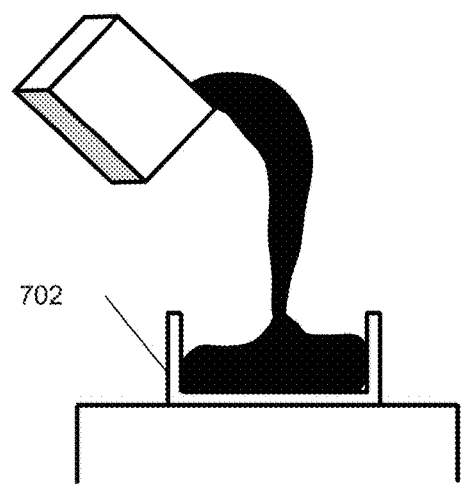
Figure 7C:
Figure 7D:
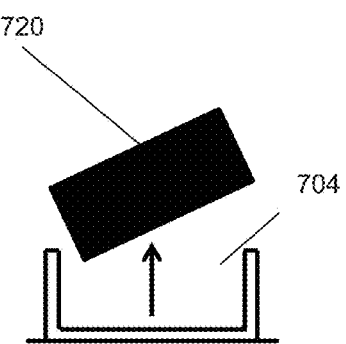

In many embodiments, a boundary surface is additively manufactured such that the interior volume of the boundary surface defines the shape of the desired object. For example, FIGS. 7A-7D illustrate the fabrication of an object in accordance with the method described above with respect to FIG. 2, where the desired object is defined by the interior volume defined by the boundary surface. More specifically, FIG. 7A depicts the fabrication of a boundary surface 702 using a point source 712. FIG. 7B depicts that the entire interior volume 704 defined by the boundary surface 702 is filled by pouring material into the volume 704. FIG. 7C depicts that the entire interior volume 704 has been filled by material. FIG. 7D depicts that the material that has filled the entire interior volume defined by the boundary surface has solidified and is removed to yield the desired object. Each of these processes can be implemented by a single additive manufacturing apparatus according to a single additive manufacturing process in accordance with embodiments of the invention.

Figure 8A:
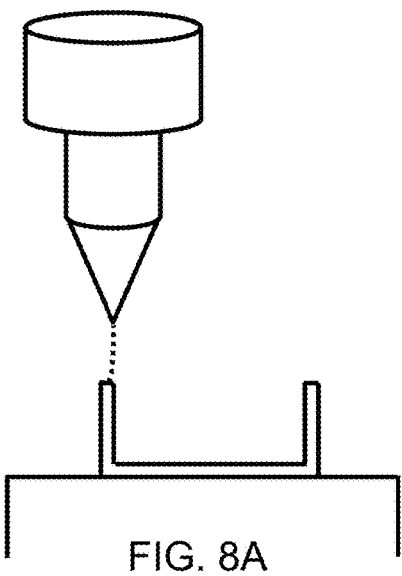
FIGS. 8A-8F illustrate using a mechanical tool to conform added material to a boundary surface in accordance with an embodiment of the invention.
Figure 8B:
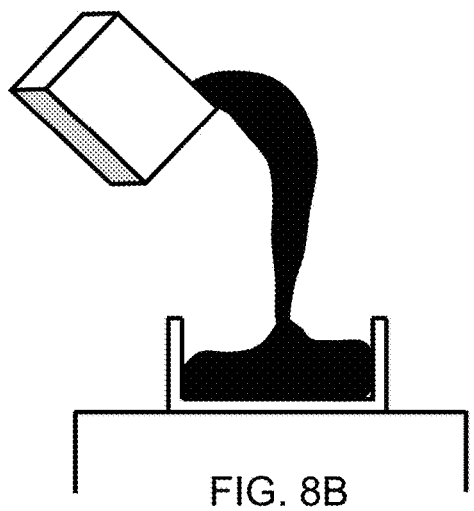
Figure 8C:
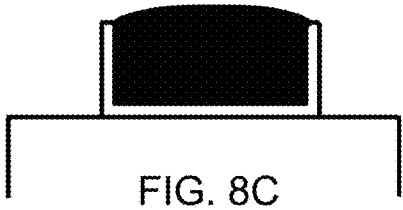
Figure 8D:
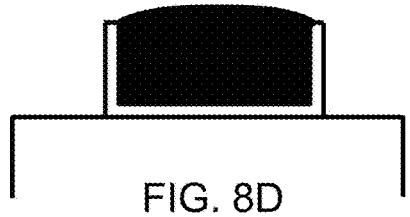
Figure 8E:
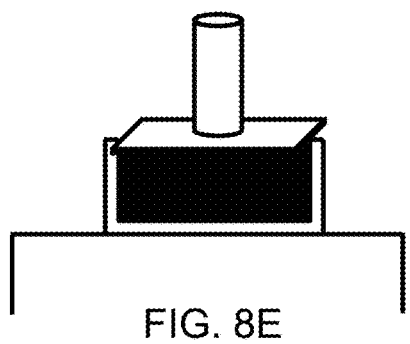
Figure 8F:
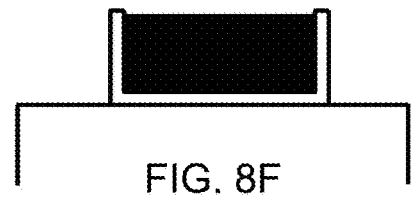

Of course, one of ordinary skill in the art would appreciate that the above described techniques can be varied in any number of ways in accordance with embodiments of the invention. For instance in many embodiments, a mechanical tool is used to compress deposited material so that it more tightly conforms to volume defined by the boundary surface. FIGS. 8A-8F depict using a mechanical tool to facilitate the conformance of deposited material to an additively manufactured boundary surface. In particular, FIG. 8A depicts the fabrication of a boundary surface; FIG. 8B depicts pouring material into the volume enclosed by the boundary surface; FIG. 8C depicts how the poured in material is not perfectly level with the top of the boundary surface; FIG. 8D depicts that a mechanical tool is used to force the material into the volume defined by the boundary surface; FIG. 8E depicts that the mechanical tool is used to force the material into the volume defined by the boundary surface; and FIG. 8F depicts that the material has been forced into the volume defined by the boundary surface. In effect, the use of a mechanical tool can enhance the fidelity of the final object While the above descriptions provide methods for additively manufacturing techniques, it should be clear the listed methods can be modified in any number of ways in accordance with embodiments of the invention. For instance, in many embodiments, the methods further include curing the deposited material. Moreover, while the above descriptions have regarded techniques for additively manufacturing objects, in many embodiments, additive manufacturing apparatuses are provided that can vary the deposition/material formation characteristics during the additive manufacture of a single object. These aspects are now discussed in greater detail below.

Additive Manufacturing Apparatuses that can Vary Deposition and/or Material Formation Characteristics During Additive Manufacturing Processes In many embodiments, additive manufacturing apparatuses that can vary deposition and/or material formation characteristics during additive manufacturing processes are provided. For instance, in many embodiments, additive manufacturing apparatuses include at least two nozzles that are each characterized by different rates of material deposition. In a number of embodiments, additive manufacturing apparatus include at least two nozzles that are each characterized in that they employ different deposition geometries. In numerous of embodiments, additive manufacturing apparatuses include at least two nozzles that each characterized in that they employ a different deposition geometry and thereby a different rate of deposition.

Figure 9:
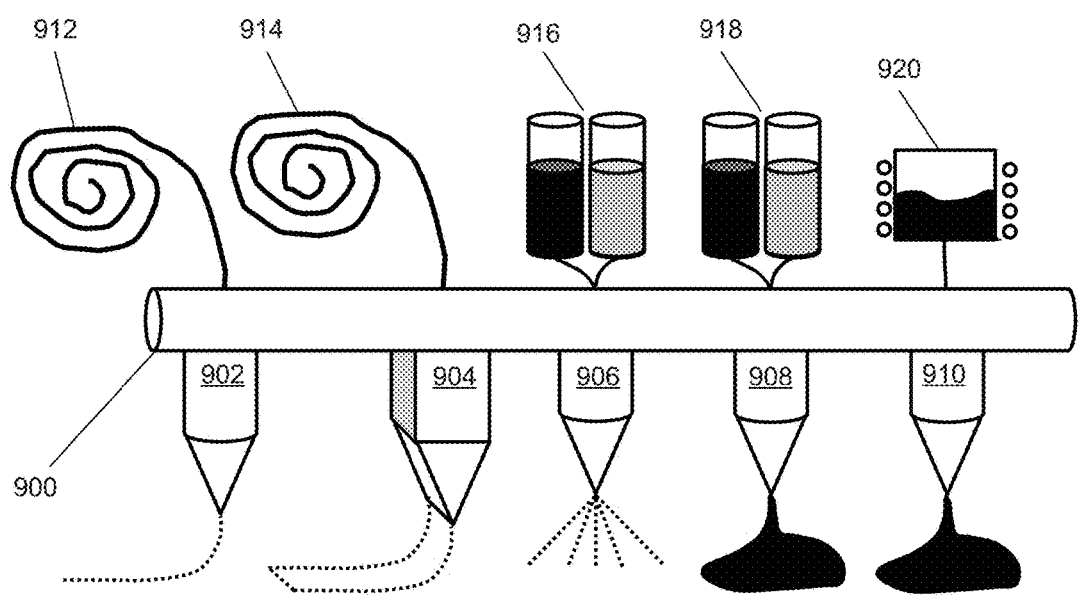
FIG. 9 illustrates the build head of an additive manufacturing apparatus that includes multiple different nozzles, each characterized by a different set of deposition characteristics, in accordance with an embodiment of the invention.

For example, FIG. 9 depicts a build head of an additive manufacturing apparatuses that includes a plurality of nozzle heads that are each characterized by different sets of deposition characteristics in accordance with embodiments of the invention. In particular, the illustrated embodiment depicts that the build head 900 includes a first nozzle 902 that acts as a point source, a second nozzle 904 that acts as a surface source by depositing a ribbon of material, a third nozzle 906 that acts as a surface source by spraying material, and fourth and fifth nozzles that act as a volume source by depositing material in bulk. In the illustrated embodiment, each of the nozzle heads are coupled with respective feedstock sources. In particular, each of the first and second nozzle heads 902 and 904 are coupled to respective feedstock wire 912 and 914. Each of the third nozzle head 906 and the fourth nozzle head 908 are coupled to respective liquid polymer reservoirs 916 and 918 that quickly cure upon the mixing of the two initially separated polymeric materials (when the material is deposited, the two separated materials are mixed and thereby quickly cure such that they solidify). The fifth nozzle head 910 is coupled to a molten polymer reservoir 920. Accordingly, as each of the nozzles are within a single additive manufacturing apparatus, the above-described additive manufacturing methods can be implemented, e.g. additive manufacturing processes can be implemented that employ different sets of deposition characteristics during the additive manufacture of an object.

Figure 10A:
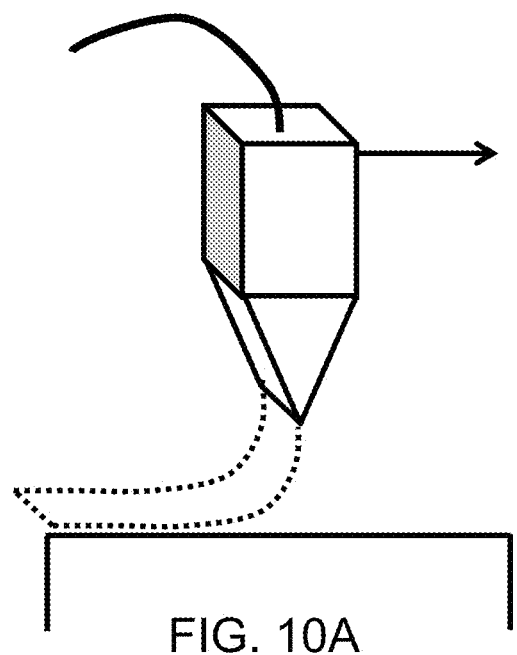
FIGS. 10A-10B illustrate nozzles each configured to deposit material in a surface format, but with different widths in accordance with an embodiment of the invention.
Figure 10B:
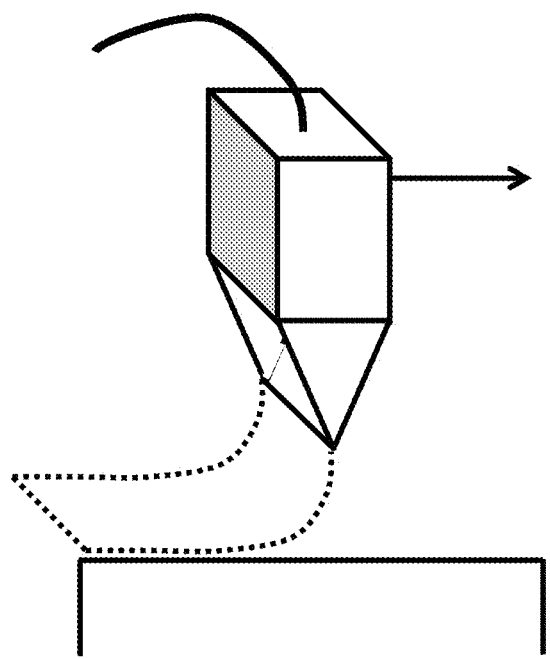

While FIG. 9 depicts nozzles that are configured to deposit polymeric materials, it should be clear that the nozzles can be configured to deposit any of a variety of materials—e.g. any of those listed above (metallic glass-based materials, metals, polymers, ceramics, waxes, etc.)—in accordance with embodiments of the invention. It should also be appreciated that, although certain nozzles are depicted, any of a variety of different types of nozzles can be incorporated in accordance with embodiments of the invention. For instance, in some embodiments, an additive manufacturing apparatus includes nozzles configured to deposit ribbons of different widths. FIGS. 10A and 10B depict nozzle heads configured to deposit ribbons of different widths. In particular, FIG. 10A depicts a nozzle head configured to deposit a ribbon of a given width, and FIG. 10B depicts a nozzle head configured to deposit a ribbon having a greater width. Note that the nozzle depicted in FIG. 10B will generally consume more feedstock material per distance travelled than the nozzle depicted in FIG. 10A. Similarly, relative to when the nozzle heads are moving at the same rate, the nozzle depicted in FIG. 10B will generally consume more feedstock wire per unit time than that seen in FIG. 10A. Recall that, as discussed above (e.g. with respect to FIGS. 6A-6C), being able to deposit ribbons of different geometries may be beneficial insofar as the differently sized ribbons can better suit the buildup of particular geometries.

Figure 11A:
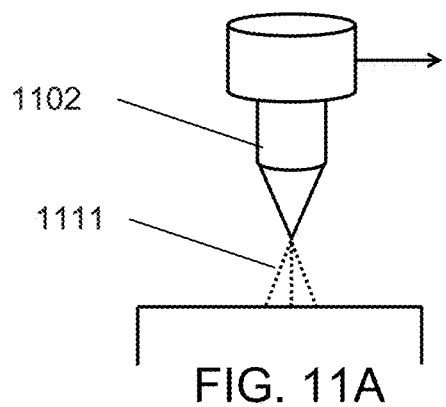
FIGS. 11A-11C illustrate a nozzle having a variable spray radius in accordance with an embodiment of the invention.
Figure 11B:
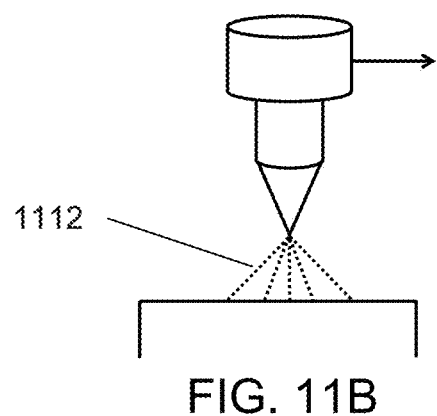
Figure 11C:
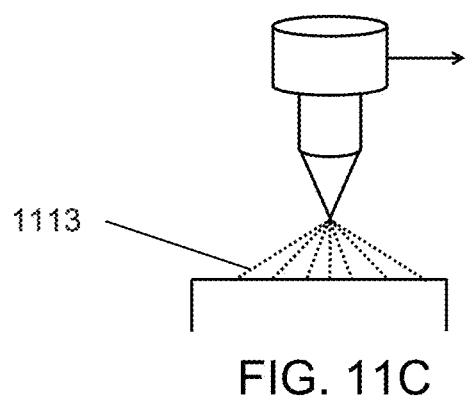

In many embodiments, an additive manufacturing apparatus includes a nozzle that can vary its deposition geometry. For instance, in a number of embodiments, a nozzle that is configured to deposit material in a ribbon form factor (and thereby acts as a surface source) can control the width of its opening such that the width of the extruded ribbon can be controlled. In many embodiments, a nozzle that is configured to deposit material in a surface form factor by spraying material can have its spray radius controlled such that the characteristic length of the applied material can be controlled. For example, FIGS. 11A-11C depict a nozzle that can have its spray radius controlled, and can thereby have its deposition geometry controlled. In particular, FIG. 11A depicts that the nozzle 1102 is spraying material in accordance with a first spray radius 1111. FIG. 11B depicts that the nozzle 1102 has been adjusted so that it is spraying material in accordance with a second spray radius 1112 that is larger than the first spray radius. And FIG. 11C depicts that the nozzle 1102 is spraying material in accordance with an even larger spray radius 1113. In this way, it is seen that the deposition geometry can be adjusted within a single nozzle in accordance with certain embodiments of the invention. As can be appreciated, the nozzle can be moved away from the working surface to increase the spray diameter in accordance with embodiments of the invention.

Figure 12:
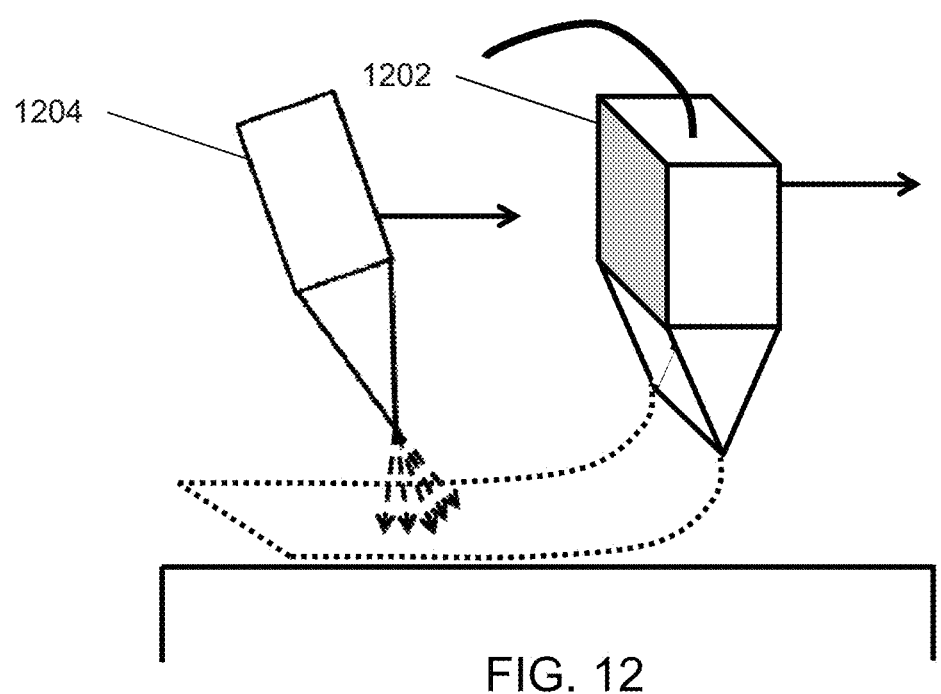
FIG. 12 illustrates the incorporation of a curing subassembly in conjunction with an additive manufacturing apparatus that is configured to implement multiple sets of deposition characteristics in accordance with an embodiment of the invention.

In many embodiments, other additive manufacturing subassemblies are used in conjunction with the above described aspects. For instance in many embodiments, an additive manufacturing apparatus that can implement a range of deposition characteristics includes a curing subassembly that cures deposited material. For example, FIG. 12 depicts an additive manufacturing apparatus whereby a surface source 1202 is used in conjunction with a curing subassembly 1204 that can cure deposited ribbon. Of course, it should be clear that any of a variety of subassemblies can be in incorporated in conjunction with additive manufacturing apparatuses that can implement multiple deposition characteristics. For example, a cooling subassembly may be incorporated. In a number of embodiments, an additive manufacturing apparatus includes a mechanical tool configured to conform deposited pliable material to an already deposited boundary surface, such as that depicted in FIGS. 8A-8F. In these ways, additive manufacturing apparatus can be made to be particularly versatile and comprehensive.

Of course, it should be appreciated, that the additive manufacturing apparatuses described above can be modified in any suitable way in accordance with embodiments of the invention. For instance, in some embodiments, a single heating element may be used to prepare feedstock material prior to deposition. For example, where an additive manufacturing apparatus includes a wire feedstock material and feedstock material in the form of a molten material, a single heating source—e.g. a laser or a resistive heating element—may be used to treat the feedstock material prior to its deposition. In some embodiments, the additive manufacturing apparatus further includes subtractive manufacturing subassemblies, e.g. mills. The inclusion of subtractive manufacturing subassemblies can further bolster the versatility of an additive manufacturing apparatuses. Of course, while several examples are given, it should be appreciated that any number of variations can be implemented in accordance with embodiments, of the invention. The discussed examples are meant to be illustrative and not comprehensive.

Importantly, it should be understood that the operation of the above-described additive manufacturing apparatuses can be controlled by any suitable controller—the controller that controls the operation of the additive manufacturing apparatus can be understood to be a 'manufacturing controller'. In many embodiments, the manufacturing controller can be implemented via a computation device such as a desktop personal computer, a laptop computer, a tablet computer, or can be embedded onto the apparatus itself. While certain examples are given, the manufacturing controller can of course be implemented in any suitable way in accordance with embodiments of the invention. As can be appreciated, the manufacturing controller can receive and/or compute instructions for controlling the operation of the additive manufacturing apparatus.

While the above discussions have regarded additive manufacturing techniques and additive manufacturing apparatuses relating to implementing varying deposition characteristics during the additive manufacture of objects, in many embodiments, processes for determining additive manufacturing strategies that rely on employing different sets of deposition characteristics and controlling additive manufacturing apparatuses in accordance with the determined strategies are provided, and these are discussed in greater detail below.

Processes for Determining the Efficient Additive Manufacture of an Object Based on Utilizing Different Deposition Characteristics In many embodiments, processes for determining the efficient additive manufacture of an object based on the utilization of different sets of deposition characteristics are provided. In many embodiments, these processes are implemented by a manufacturing controller associated with an additive manufacturing apparatus. In numerous embodiments, a provided 3-dimensional model is analyzed to determine a strategy for the additive manufacture of the object based on employing different sets of deposition characteristics during the additive manufacture. The determination of the strategy can be made based on known available deposition characteristics, based on the geometry of the provided model, and/or based on the material(s) used in the buildup of the object. For example, in many embodiments, where it is known that the additive manufacture of an object can involve point deposition and surface deposition, the determined additive manufacturing strategy can include identifying intricate portions of the object, identifying blunt portions of the object, and determining to use the point source to fabricate the intricate portions of the desired object and the surface source to build up the blunt portions of the desired object. In some embodiments, where it is given that the additive manufacture of an object will involve point deposition and volume deposition, the determination of the additive manufacturing strategy can include identifying a boundary surface of the desired object, identifying a corresponding interior volume enclosed within the boundary surface, and determining that the additive manufacture of the object include manufacturing the boundary surface using the point source, and thereafter manufacturing the interior volume using the volume source.

Figure 13:
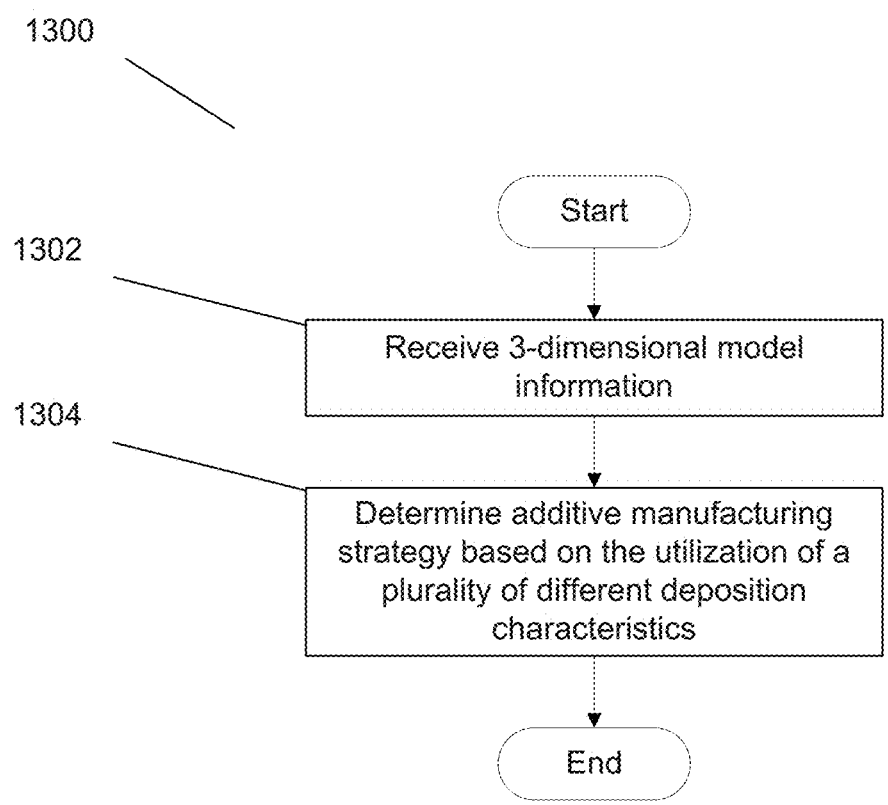
FIG. 13 illustrates a process for determining an additive manufacturing strategy based on utilizing a plurality of different sets of deposition characteristics in accordance with an embodiment of the invention.

FIG. 13 illustrates a process of determining the efficient additive manufacture of an object based on the utilization of different deposition characteristics in accordance with an embodiment of the invention. In particular, the process 1300 includes receiving (1302) receiving 3-dimensional model information of a desired object. In many instances, the process 1300 is performed by a manufacturing controller, a desktop computer, a laptop computer, a tablet computer, a cell phone, or any other device capable of computation. Accordingly, the model can be received (1302) by the computation device in any suitable form. For example, the 3-dimensional model information can be received as any of a variety of computer-aided design (CAD) file formats; the model information can also be input by a user (e.g. a user can draft the 3-dimensional model on the computation device); in some embodiments, a physical model exists, and the model is scanned using an associated scanning device and thereby received by the computation device. The process 1300 can further include determining (1304) an additive manufacturing strategy based on the utilization of a plurality of different sets of deposition characteristics. As can be appreciated, the determination (1304) can be made so as to result in the efficient additive manufacture of the received model. In many instances, the determination (1304) is effected by analyzing the geometry of the received model and thereby determining an additive manufacturing strategy in view of the known available sets of deposition characteristics. The additive manufacturing strategy can be determined (1304) based on the utilization of any of a variety of different sets of deposition characteristics including, but not limited to, utilizing different deposition rates and/or different deposition geometries. In many embodiments, determining (1304) the additive manufacturing strategy accounts for the deposited material that is used during the additive manufacture of the object. For example, where both polymeric materials and metallic materials are used during the additive manufacture of an object, the deposition of polymeric materials may benefit from the implementation of certain deposition techniques, and the deposition of metallic materials may benefit from other deposition techniques. More generally, the illustrated process can be varied in any number of ways and remain within the scope of embodiments of the invention.

Figure 14:
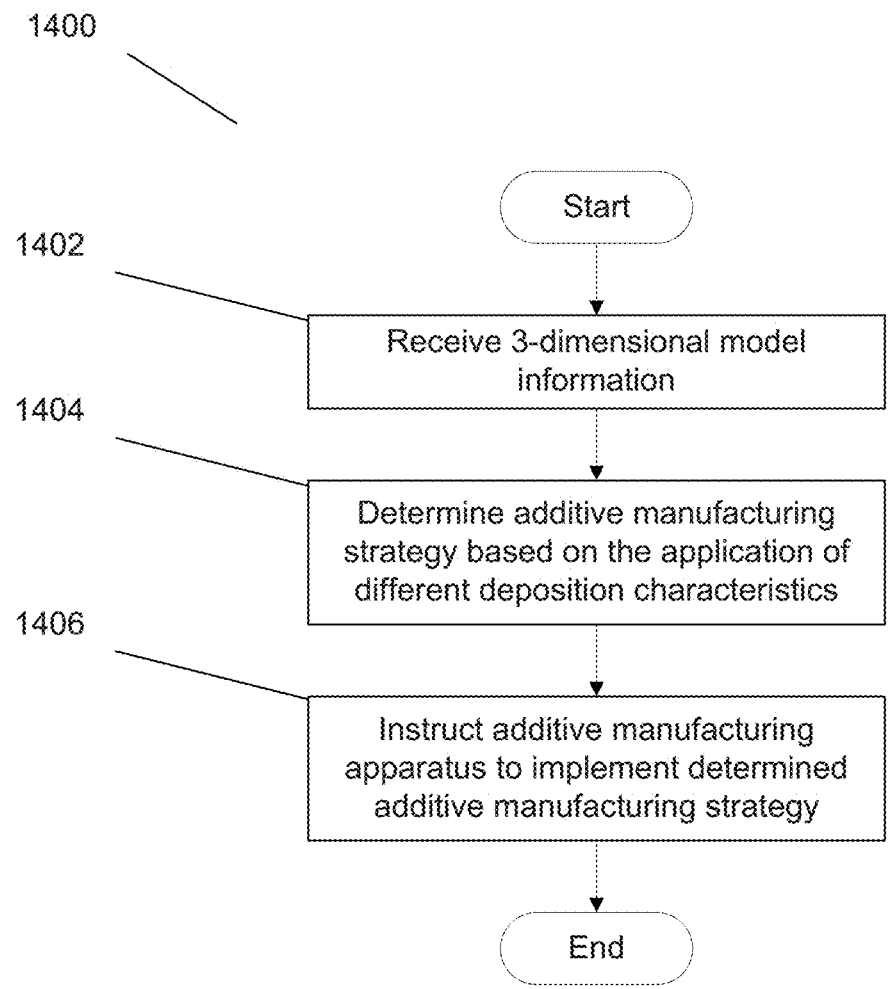
FIG. 14 illustrates a process for implementing a determined additive manufacturing strategy based on utilizing a plurality of different sets of deposition characteristics in accordance with an embodiment of the invention.

In many instances, processes for determining an efficient additive manufacturing strategy for a given model that utilize multiple deposition characteristics are effected by instructing an additive manufacturing apparatus to implement the determined strategy so as to manufacture the given model. In many embodiments, the processes are implemented by a manufacturing controller associated with an additive manufacturing apparatus, where the manufacturing controller determines the additive manufacturing strategy. For example, FIG. 14 illustrates a process for implementing a determined additive manufacturing strategy based on the utilization of a plurality of different sets of deposition characteristics where the process is implemented by a manufacturing controller which instructs the associated additive manufacturing apparatus to implement the determined strategy in accordance with an embodiment of the invention. In particular, the process is similar to that described above with respect to FIG. 13, except that the process 1400 further includes instructing (1406) an additive manufacturing apparatus to implement a determined additive manufacturing strategy to fabricate the object associated with the received model. More specifically, a manufacturing controller receives (1402) 3-dimensional model information, the manufacturing controller determines (1404) an additive manufacturing strategy, and the manufacturing controller instructs (1406) the associated additive manufacturing apparatus to implement the determined additive manufacturing strategy. In many embodiments, the additive manufacturing strategy is determined (1404) based on the sets of deposition characteristics that are available on the associated additive manufacturing device.

Figure 15:
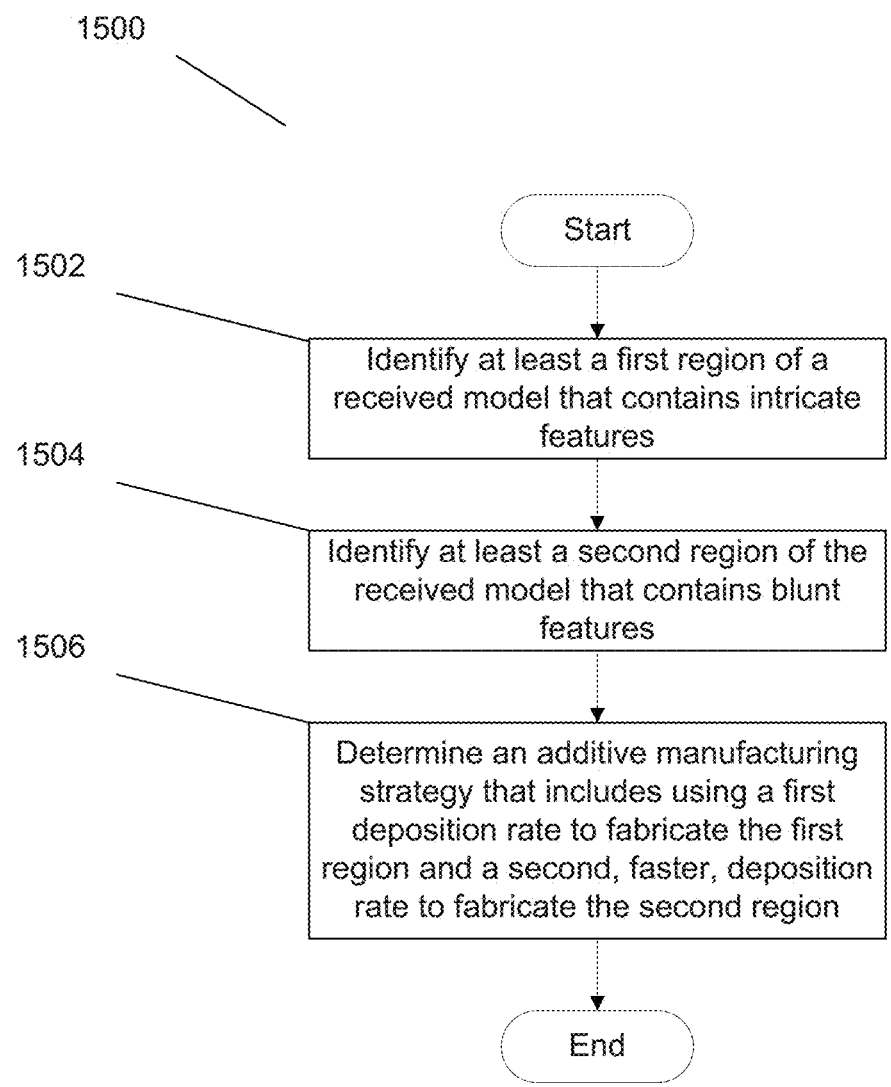
FIG. 15 illustrates a sub-process for determining an additive manufacturing strategy based on implementing different deposition rates for intricate features and bulk portions in accordance with an embodiment of the invention.

Note that the above-mentioned determination of additive manufacturing strategies can be achieved in any suitable way in accordance with embodiments of the invention. For instance, FIG. 15 illustrates a sub-process for determining an additive manufacturing strategy based on employing different deposition rates for intricate features and blunt portions. Intricate features can be characterized in that they possess at least some characteristic dimension (e.g. length, width, height) that is less than some determined threshold value. For instance in many embodiments, the determined threshold value is approximately 5 mm. Of course it should be clear that the determined threshold value can be any suitable threshold value. Blunt portions can be understood to mean portions that have at least two characteristic dimensions (e.g. length, width, height) that are each larger than determined respective threshold values. In many embodiments, the determined threshold value for each of the respective dimensions is 1 cm. Of course it should be clear that the determined threshold value can be any suitable threshold value. The illustrated sub-process 1500 includes identifying (1502) at least a first region of a received model that contains intricate features. The sub-process 1500 further includes identifying (1504) at least a second region of the received model that contains blunt features. The sub-process 1500 further includes determining (1506) an additive manufacturing strategy that includes implementing a first deposition rate in the fabrication of the first region, and a second, faster, deposition rate in the fabrication of the second region. As can be appreciated, the sub-process 1500 can be implemented by any suitable mechanism including any suitable computation device, e.g. a computer, a tablet, cell phone, or the manufacturing controller. In numerous embodiments, the determination (1506) of an additive manufacturing strategy accounts for known available deposition characteristics. For instance, where the sub-process is performed in conjunction with an associated additive manufacturing apparatus, the determination can be made in view of the additive manufacturing apparatus's available deposition characteristics. For example, where it is known that a point source and a surface source are available for the additive manufacture of the object, the determination (1506) of the additive manufacturing strategy can involve specifying that the first region be additively manufactured using the point source, while the second region be additively manufactured using the surface source. Of course, it should be clear that the determination (1506) can account for any of a variety of deposition characteristics, not just those relating to point sources and surface sources. For example, it can be specified that deposition characteristics associated with a pouring mechanism are available.

In many embodiments, the determination (1506) of an additive manufacturing strategy includes specifying a particular tool path that a nozzle (or other mechanism configured to deposit material) of an additive manufacturing apparatus is to traverse. For example, the determination (1506) of an additive manufacturing strategy can involve concluding the specific path to be traversed by the point source to build up the first region, as well as the specific path to be traversed by the surface source to build up the second region. Moreover, the determination (1506) of the additive manufacturing strategy can involve concluding the sequence of these specific paths to be traversed by the point source and the surface source respectively. For example, it can be concluded that the blunt features be deposited prior to the intricate features. The determination of sequence can be based on any of a variety of factors including, but not limited to, the goal to derive a sequence that will result in the stability of the object as it is being built up.

While the discussion above with respect to FIG. 15 regards determining an additive manufacturing strategy based on deposition rates, in many embodiments an additive manufacturing strategy is concluded based on deposition geometries. For example, in many embodiments, the geometry of a provided 3d model is analyzed in view of available deposition geometries, and an additive manufacturing strategy is thereby determined. For instance, where a model includes two rectangular regions, one having a first width, and the other having a second, wider, width, and nozzles are available that can deposit ribbons of material having widths that correspond to the widths of the rectangular regions, additive manufacturing strategies can be determined that regard using the respective nozzles to additively manufacture the corresponding regions. As can be appreciated, any number of variations of the above-described processes can be implemented in accordance with embodiments of the invention. Moreover, the recited processes are broad and can be implemented in any number of ways in accordance with embodiments of the invention.

Figure 16:
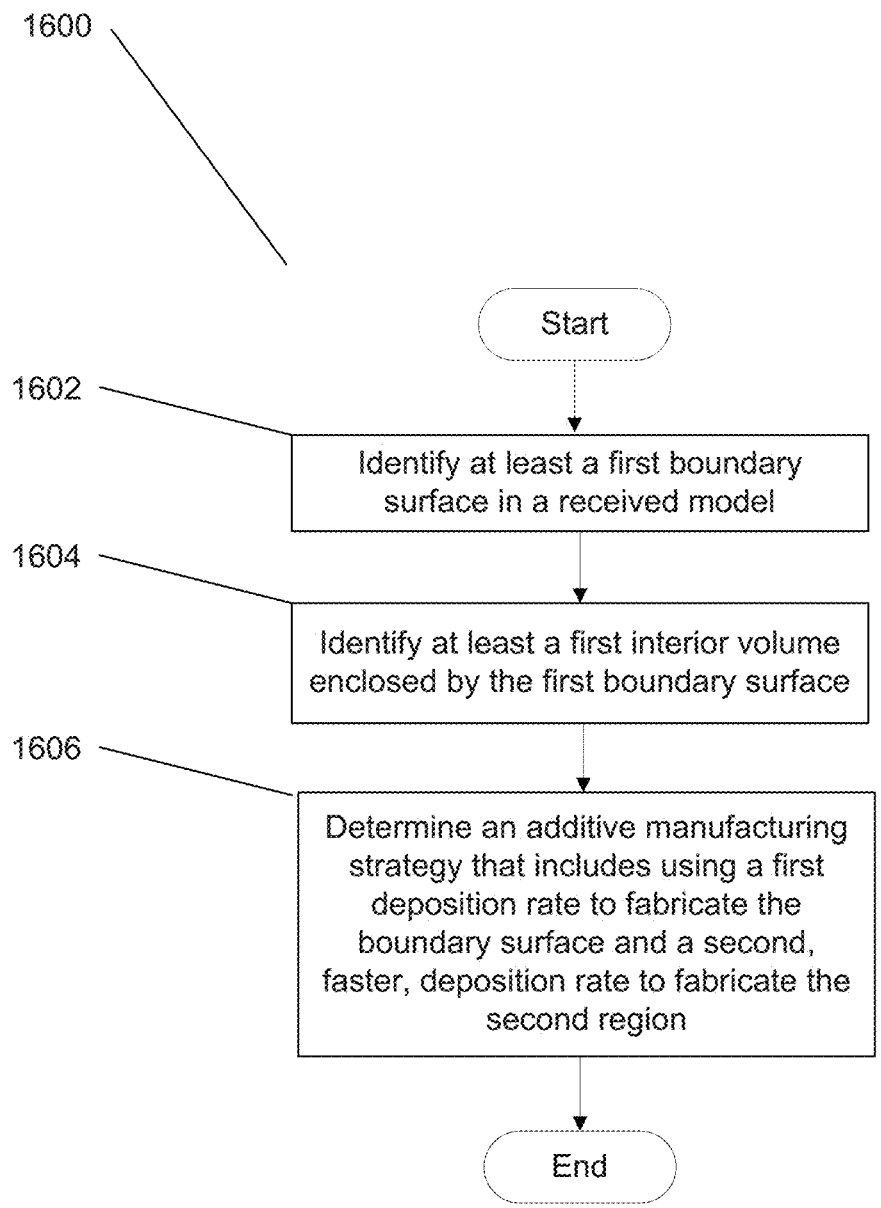
FIG. 16 illustrates a sub-process for determining an additive manufacturing strategy based on implementing different deposition rates for boundary surfaces and corresponding interior volumes in accordance with an embodiment of the invention.

In many embodiments, a sub-process for determining the efficient additive manufacture of an object include identifying boundary surfaces and corresponding interior volumes, and using appropriate deposition characteristics to build up each respective region. For example, FIG. 16 illustrates a sub-process for determining the efficient additive manufacture of an object based on the identification of boundary surfaces and corresponding interior volumes. In particular, the sub-process 1600 includes identifying (1602) at least a first boundary surface in a received model. For example, a perimeter surface can be identified (1602). The method 1600 further includes identifying (1604) at least a first interior volume enclosed by the boundary surface. In many embodiments the interior volume is the entire volume enclosed by the boundary surface. The method 1600 further includes determining (1606) an additive manufacturing strategy that includes using a first deposition rate in the additive manufacture of the boundary surface, and a second, faster, deposition rate in the additive manufacture of the interior volume. As before, in many embodiments, determining (1606) the additive manufacturing strategy includes specifying the path of traversal and identifying particular deposition characteristics. Additionally as before, in many embodiments, determining an additive manufacturing strategy is effected in view of known available deposition characteristics. While two sub-processes for determining an efficient additive manufacturing strategy are explicitly discussed, it should be clear that the determination of an additive manufacturing strategy can be accomplished using any of a variety of sub-processes in accordance with embodiments of the invention. For instance, as alluded to previously, the determination of an additive manufacturing strategy can include identifying suitable deposition geometries that accommodate the geometry of the desired object.

As can be appreciated the above-described processes can be implemented by any of a variety of non-transitory computer readable media (e.g. firmware or software) that contains processor instructions, where execution of the instructions by the processor causes the processor to implement the above-described processes. Thus, for example, firmware or software can be used in conjunction with the manufacturing controller to implement the above-described processes. Accordingly, in many embodiments, non-transitory computer readable media is provided. Further, in many embodiments, additive manufacturing apparatus systems are provided that include an additive manufacturing apparatus, memory, and a processor configured via an additive manufacturing apparatus controller application stored in the memory to implement the above-described processes.

As can be gleaned from the discussion above, the systems and methods described above can be implemented in any of a variety of ways consistent with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. An additive manufacturing apparatus comprising:
   a manufacturing controller configured to obtain a 3-dimensional model of an object and to map the model of the object by dividing the object into one or more boundary regions, wherein the perimeter of each boundary region is defined by a three-dimensional boundary surface enclosing a contiguous volume region that is to exist within the object to be manufactured, wherein the one or more boundary regions reproduce the entirety of the object;
   a first additive manufacturing element configured to define the boundary surface of at least a first boundary region of the object by depositing material onto a surface through a point deposition process at a first deposition rate; and
   a second additive manufacturing element configured to fill the associated volume of the at least first boundary region of the object by depositing material within the volume region of the at least first boundary region through one of either a surface deposition element or volume deposition element at a second deposition rate;
   wherein the second deposition rate is faster than the first deposition rate.

2. The apparatus of claim 1, wherein the surface deposition element is selected from the group consisting of: a ribbon deposition element and a jetting or spraying deposition element.

3. The apparatus of claim 1, wherein the volume deposition element is selected from the group of: a pouring element, a jetting or spraying element, an injecting element, and an extruding element.

4. The apparatus of claim 1, wherein the first additive manufacturing element comprises a nozzle including an opening through which material can be extruded, and wherein the geometry of the opening can be varied.

5. The apparatus of claim 4, wherein the geometry of the opening is a slit with a variable length.

6. The apparatus of claim 4, wherein the nozzle is configured to deposit material by one of either jetting material or spraying material onto the surface, and wherein the jet radius or spray radius can be adjusted.

7. The apparatus of claim 1, wherein the deposit material is selected from the group consisting of metals, polymers, ceramics, organic materials, and inorganic materials.

8. The apparatus of claim 1, wherein the first additive manufacturing element is a first nozzle configured to deposit a ribbon of material having a first width, and the second additive manufacturing element a second nozzle configured to deposit a ribbon of material having a second and different width.

9. The apparatus of claim 8, wherein the first nozzle is associated with a first feedstock source and the second nozzle is associated with a second feedstock source, and wherein the first feedstock source is different than the second feedstock source.

10. The apparatus of claim 8, further comprising a mechanical tool configured to conform a deposited material to the surface.

11. The apparatus of claim 8, further comprising a curing subassembly configured to cure a deposited material.

12. The apparatus of claim 1, wherein the boundary surface of the object includes features of 1 cm or less.

13. The apparatus of claim 1, further configured to produce at least a second boundary region defining a second boundary surface that is to exist within the object to be additively manufactured; and
   a second volume enclosed by the second boundary region.

14. The apparatus of claim 13, configured such that the second boundary region is deposited atop the first boundary region.

15. The apparatus of claim 13, configured such that the second boundary region is disposed within the volume enclosed by the first boundary region.

16. The apparatus of claim 13, configured such that the second boundary region defines an outer surface of the desired object.

17. The apparatus of claim 13, wherein the material deposited so as to define the first boundary region of the object is different than the material deposited so as to define the second boundary region of the object.

18. The apparatus of claim 13, wherein either the material deposited so as to define a first boundary region of the object or the material deposited so as to define the second boundary region of the object comprises a metallic glass-based material.

19. The apparatus of claim 1 further comprising conforming the material deposited within the volume to the height of the boundary surface.

20. The apparatus of claim 19, wherein the conforming is accomplished using a mechanical tool.

* * * * *